US010257726B2

United States Patent
Ohta et al.

(10) Patent No.: US 10,257,726 B2
(45) Date of Patent: Apr. 9, 2019

(54) WIRELESS COMMUNICATION METHOD, WIRELESS COMMUNICATION SYSTEM, BASE STATION, AND WIRELESS TERMINAL

(71) Applicant: FUJITSU CONNECTED TECHNOLOGIES LIMITED, Kawasaki-shi, Kanagawa (JP)

(72) Inventors: Yoshiaki Ohta, Yokohama (JP); Yoshihiro Kawasaki, Kawasaki (JP)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 0 days.

(21) Appl. No.: 15/052,260

(22) Filed: Feb. 24, 2016

(65) Prior Publication Data

US 2016/0174092 A1    Jun. 16, 2016

Related U.S. Application Data

(63) Continuation of application No. 14/594,549, filed on Jan. 12, 2015, now Pat. No. 9,648,508, which is a (Continued)

(51) Int. Cl.
*H04W 24/08* (2009.01)
*H04W 24/10* (2009.01)
(Continued)

(52) U.S. Cl.
CPC .......... *H04W 24/08* (2013.01); *H04B 17/345* (2015.01); *H04L 1/00* (2013.01);
(Continued)

(58) Field of Classification Search
CPC ... H04W 24/08; H04W 72/082; H04B 17/345
See application file for complete search history.

(56) References Cited

U.S. PATENT DOCUMENTS

2008/0285534 A1   11/2008   Dent
2009/0135775 A1   5/2009    Du et al.
(Continued)

FOREIGN PATENT DOCUMENTS

JP    2007-96749 A     4/2007
JP    2008-288932 A    11/2008
(Continued)

OTHER PUBLICATIONS

3GPP TR 36.816 V11.2.0, "3rd Generation Partnership Project; Technical Specification Group Radio Access Network; Evolved Universal Terrestrial Radio Access(E-UTRA); Study on signalling and procedure for interference avoidance for in-device coexistence(Release 11)", Dec. 2011.
(Continued)

*Primary Examiner* — Curtis A Alia
(74) *Attorney, Agent, or Firm* — Myers Wolin, LLC

(57) ABSTRACT

A wireless terminal, includes a first transceiver configured to transmit a first type of wireless signal; and a second transceiver configured to transmit a second type of wireless signal; wherein the first transceiver is configured to transmit an indication of interference when interference is detected between the first type of wireless signal and the second type of wireless signal and to transmit information showing a condition of each of the first and second types of wireless signal with the indication of interference; and the first transceiver is further configured to receive interference control information useable by the terminal in mitigating the detected interference.

17 Claims, 18 Drawing Sheets

Related U.S. Application Data continuation of application No. PCT/JP2012/004641, filed on Jul. 20, 2012.

(51) Int. Cl.

| | | |
|---|---|---|
| *H04W 72/08* | (2009.01) | |
| *H04W 52/02* | (2009.01) | |
| *H04W 72/04* | (2009.01) | |
| *H04L 1/00* | (2006.01) | |
| *H04B 17/345* | (2015.01) | |
| *H04W 52/04* | (2009.01) | |

(52) U.S. Cl.
CPC ....... *H04W 24/10* (2013.01); *H04W 52/0216* (2013.01); *H04W 72/0406* (2013.01); *H04W 72/082* (2013.01); *H04W 52/04* (2013.01); *Y02D 70/00* (2018.01); *Y02D 70/1262* (2018.01); *Y02D 70/1264* (2018.01); *Y02D 70/142* (2018.01); *Y02D 70/144* (2018.01); *Y02D 70/23* (2018.01); *Y02D 70/24* (2018.01)

(56) References Cited

U.S. PATENT DOCUMENTS

| | | | |
|---|---|---|---|
| 2009/0196162 | A1 | 8/2009 | Sambhwani et al. |
| 2010/0008244 | A1 | 1/2010 | Sampath et al. |
| 2012/0020231 | A1* | 1/2012 | Chen ............. H04W 36/08 370/252 |
| 2012/0040620 | A1 | 2/2012 | Fu et al. |
| 2012/0069766 | A1 | 3/2012 | Fu et al. |
| 2012/0120860 | A1* | 5/2012 | Chui ............. H04B 1/711 370/311 |
| 2012/0214489 | A1 | 8/2012 | Koo et al. |
| 2013/0084907 | A1 | 4/2013 | Shen et al. |
| 2013/0157680 | A1 | 6/2013 | Morita et al. |
| 2013/0203432 | A1* | 8/2013 | Wang ............. H04W 72/082 455/452.1 |
| 2013/0242860 | A1* | 9/2013 | Kim ............. H04W 72/082 370/328 |

FOREIGN PATENT DOCUMENTS

| | | |
|---|---|---|
| JP | 2009-60250 A | 3/2009 |
| JP | 2011-514042 A | 4/2011 |
| JP | 2011-527878 A | 11/2011 |
| WO | 2012/042730 A1 | 4/2012 |

OTHER PUBLICATIONS

International Search Report issued for corresponding International Patent Application No. JP2012/004641, dated Sep. 4, 2012, with an English translation.

ZTE, "Considerations on the detail procedure for FDM approach", Agenda Item: 7.8.2, 3GPP TSG-RAN WG2 Meeting #72bis, R2-110243, Dublin, Ireland, Jan. 17-21, 2011.

Extended European search report with the supplementary European search report and the European search opinion issued for corresponding European Patent Application No. 12881370.6 dated Jun. 25, 2015.

3GPP TS 36.300 V11.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Jun. 2012.

Samsung, "Over all signaling for IDC", Agenda Item: 7.6.2, 3GPP TSG RAN WG2 Meeting #78, R2-122509, 3rd Generation Partnership Project (3GPP), Prague, Czech Republic, May 21-25, 2012.

New Postcom, "Consideration on IDC indication", Agenda Item: 7.6.2, 3GPP TSG RAN WG2 Meeting #78, R2-122355, 3rd Generation Partnership Project (3GPP), Prague, Czech Republic, May 21-25, 2012.

Notice of Preliminary Rejection issued for corresponding Korean Patent Application No. 102015-7000816 dated Jan. 14, 2016 with an English translation.

CMCC, "On the procedure of interference avoidance for IDC", Agenda Item: 7.6.2.2, 3GPP TSG-RAN WG2 Meeting #77bis, R2-121149, Jeju, South Korea, Mar. 26-30, 2012.

Research in Motion UK Limited, "Assistance Information Reporting for TDM solution", Agenda Item: 7.6.3, 3GPP TSG-RAN WG2 Meeting #75bis, R2-115162, Zhuhai, China, Oct. 10-14, 2011.

Notification of Reasons for Refusal issued for corresponding Japanese Patent Application No. 2014-525570 dated Feb. 2, 2016 with a partial English translation.

Non-Final Office Action issued by the United States Patent and Trademark Office for corresponding U.S. Appl. No. 14/594,549 electronically delivered on Sep. 13, 2016.

First Notification of Office Action issued by the State Intellectual Property Office of China for corresponding Chinese Patent Application No. 201280074706.1, dated Jul. 20, 2017, with an English translation.

Samsung, "Detailed information from UE to eNB in the indication to inform in-device interference", 3GPP TSG-RAN2#77 meeting, Agenda Item 7.6.2.2, R2-120281, Feb. 6-10, 2012, Dresden, Germany.

Second Notification of Office Action issued by the State Intellectual Property Office of China for corresponding Chinese Patent Application No. 201280074706.1, dated Feb. 8, 2018, with an English translation.

Notification of Reasons for Refusal issued by the Japan Patent Office for corresponding Japanese Patent Application No. 2017-160658, dated Oct. 30, 2018, with an English translation.

Non-Final Office Action issued by the United States Patent and Trademark Office for corresponding U.S. Appl. No. 15/938,778, electronically delivered on Dec. 14, 2018.

Appeal Decision issued by the Japan Patent Office for Japanese patent application No. 2014-525570, dated Nov. 20, 2018, with full machine translation of the Appeal Decision.

Communication pursuant to Article 94(3) EPC issued by the European Patent Office for corresponding European Patent Application No. 12 881 370.6-1215, dated Feb. 6, 2019.

* cited by examiner

FIG. 13A

|  | MUTUAL INTERFERENCE | ONLY LTE DEGRADATION | ONLY ISM DEGRADATION |
|---|---|---|---|
| LTE COMMUNICATION PREFERENCE | SET AS X=1 | SET AS X=1 | - |
| ISM COMMUNICATION PREFERENCE | SET AS X=0 | - | SET AS X=0 |

FIG. 13B

|  | MUTUAL INTERFERENCE | ONLY LTE DEGRADATION | ONLY ISM DEGRADATION |
|---|---|---|---|
| LTE COMMUNICATION PREFERENCE | INCREASE ACTIVATION LEVEL OF LTE COMMUNICATION | INCREASE ACTIVATION LEVEL OF LTE COMMUNICATION | - |
| ISM COMMUNICATION PREFERENCE | DECREASE ACTIVATION LEVEL OF LTE COMMUNICATION | - | DECREASE ACTIVATION LEVEL OF LTE COMMUNICATION |

FIG. 14A

|  | MUTUAL INTERFERENCE | ONLY LTE DEGRADATION | ONLY ISM DEGRADATION |
|---|---|---|---|
| LTE COMMUNICATION PREFERENCE | SET AS X=000 | SET AS X=010 | SET AS X=100 |
| ISM COMMUNICATION PREFERENCE | SET AS X=001 | SET AS X=011 | SET AS X=101 |

FIG. 14B

|  | MUTUAL INTERFERENCE | ONLY LTE DEGRADATION | ONLY ISM DEGRADATION |
|---|---|---|---|
| LTE COMMUNICATION PREFERENCE | AT LEAST MAINTAIN CURRENT SETTING OR INCREASE ACTIVATION LEVEL OF LTE COMMUNICATION | INCREASE ACTIVATION LEVEL OF LTE COMMUNICATION | AT LEAST MAINTAIN CURRENT SETTING OR DECREASE ACTIVATION LEVEL OF LTE COMMUNICATION |
| ISM COMMUNICATION PREFERENCE | AT LEAST MAINTAIN CURRENT SETTING OR DECREASE ACTIVATION LEVEL OF LTE COMMUNICATION | AT LEAST MAINTAIN CURRENT SETTING OR INCREASE ACTIVATION LEVEL OF LTE COMMUNICATION | DECREASE ACTIVATION LEVEL OF LTE COMMUNICATION |

FIG. 15A

|  | MUTUAL INTERFERENCE | ONLY LTE DEGRADATION | ONLY ISM DEGRADATION |
|---|---|---|---|
| LTE VoIP COMMUNICATION PREFERENCE | SET AS X=0 | SET AS X=0 | - |
| LTE VoIP COMMUNICATION PREFERENCE + LTE Data COMMUNICATION PREFERENCE | SET AS X=1 | SET AS X=1 | - |

FIG. 15B

|  | MUTUAL INTERFERENCE | ONLY LTE DEGRADATION | ONLY ISM DEGRADATION |
|---|---|---|---|
| LTE VoIP COMMUNICATION PREFERENCE | MAINTAIN SETTING OF LTE VoIP WHEN LTE VoIP COMMUNICATION IS BEING EXECUTED, LOWER PRECEDENCE OF OTHER COMMUNICATION WHEN OTHER COMMUNICATIONS ARE BEING EXECUTED AT THE SAME TIME | MAINTAIN SETTING OF LTE VoIP WHEN LTE VoIP COMMUNICATION IS BEING EXECUTED, LOWER PRECEDENCE OF OTHER COMMUNICATION WHEN OTHER COMMUNICATIONS ARE BEING EXECUTED AT THE SAME TIME | - |
| LTE VoIP COMMUNICATION PREFERENCE + LTE Data COMMUNICATION PREFERENCE | MAINTAIN SETTING OF LTE VoIP WHEN LTE VoIP COMMUNICATION IS BEING EXECUTED, INCREASE ACTIVATION LEVEL OF LTE Data COMMUNICATION WHEN OTHER COMMUNICATIONS ARE BEING EXECUTED AT THE SAME TIME | MAINTAIN SETTING OF LTE VoIP WHEN LTE VoIP COMMUNICATION IS BEING EXECUTED, INCREASE ACTIVATION LEVEL OF LTE Data COMMUNICATION WHEN OTHER COMMUNICATIONS ARE BEING EXECUTED AT THE SAME TIME | - |

FIG. 16A

|  | MUTUAL INTERFERENCE | ONLY LTE DEGRADATION | ONLY ISM DEGRADATION |
|---|---|---|---|
| LTE VoIP COMMUNICATION PREFERENCE | SET AS X=000 | SET AS X=010 | SET AS X=100 |
| LTE VoIP COMMUNICATION PREFERENCE + LTE Data COMMUNICATION PREFERENCE | SET AS X=001 | SET AS X=011 | SET AS X=101 |

FIG. 16B

|  | MUTUAL INTERFERENCE | ONLY LTE DEGRADATION | ONLY ISM DEGRADATION |
|---|---|---|---|
| LTE VoIP COMMUNICATION PREFERENCE | AT LEAST MAINTAIN SETTING OF VoIP WHEN LTE VoIP COMMUNICATION IS BEING EXECUTED, AT LEAST MAINTAIN CURRENT SETTING OF OTHER COMMUNICATION OR LOWER PRECEDENCE OF OTHER COMMUNICATION WHEN OTHER COMMUNICATIONS ARE BEING EXECUTED AT THE SAME TIME | MAINTAIN SETTING OF VoIP WHEN LTE VoIP COMMUNICATION IS BEING EXECUTED, LOWER PRECEDENCE OF OTHER COMMUNICATION WHEN OTHER COMMUNICATIONS ARE BEING EXECUTED AT THE SAME TIME | AT LEAST MAINTAIN CURRENT SETTING, DECREASE ACTIVATION LEVEL OF LTE Data COMMUNICATION WHEN LTE Data COMMUNICATION IS BEING EXECUTED |
| LTE VoIP COMMUNICATION PREFERENCE + LTE Data COMMUNICATION PREFERENCE | MAINTAIN SETTING OF VoIP COMMUNICATION WHEN LTE VoIP COMMUNICATION IS BEING EXECUTED, AT LEAST MAINTAIN CURRENT SETTING OF LTE Data COMMUNICATION OR INCREASE ACTIVATION LEVEL OF LTE Data COMMUNICATION WHEN OTHER COMMUNICATIONS ARE BEING EXECUTED AT THE SAME TIME | MAINTAIN SETTING OF VoIP COMMUNICATION WHEN LTE VoIP COMMUNICATION IS BEING EXECUTED, INCREASE ACTIVATION LEVEL OF LTE Data COMMUNICATION WHEN OTHER COMMUNICATIONS ARE BEING EXECUTED AT THE SAME TIME | AT LEAST MAINTAIN CURRENT SETTING, DECREASE ACTIVATION LEVEL OF LTE Data COMMUNICATION WHEN LTE Data COMMUNICATION IS BEING EXECUTED |

FIG. 17A

|  | MUTUAL INTERFERENCE | ONLY LTE DEGRADATION | ONLY ISM DEGRADATION |
|---|---|---|---|
| LTE VoIP COMMUNICATION PREFERENCE | SET AS X=0000 | SET AS X=0010 | SET AS X=0100 |
| LTE VoIP COMMUNICATION PREFERENCE + LTE Data COMMUNICATION PREFERENCE | SET AS X=0001 | SET AS X=0011 | SET AS X=0101 |
| ISM COMMUNICATION PREFERENCE | SET AS X=0010 | SET AS X=0100 | SET AS X=0110 |

FIG. 17B

|  | MUTUAL INTERFERENCE | ONLY LTE DEGRADATION | ONLY ISM DEGRADATION |
|---|---|---|---|
| LTE VoIP COMMUNICATION PREFERENCE | AT LEAST MAINTAIN SETTING OF LTE VoIP WHEN LTE VoIP COMMUNICATION IS BEING EXECUTED, AT LEAST MAINTAIN CURRENT SETTING OF OTHER COMMUNICATION OR LOWER PRECEDENCE OF OTHER COMMUNICATION WHEN OTHER COMMUNICATIONS ARE BEING EXECUTED AT THE SAME TIME | MAINTAIN SETTING OF LTE VoIP WHEN LTE VoIP COMMUNICATION IS BEING EXECUTED, LOWER PRECEDENCE OF OTHER COMMUNICATION WHEN OTHER COMMUNICATIONS ARE BEING EXECUTED AT THE SAME TIME | AT LEAST MAINTAIN CURRENT SETTING, OR DECREASE ACTIVATION LEVEL OF LTE Data COMMUNICATION WHEN LTE Data COMMUNICATION IS BEING EXECUTED |
| LTE VoIP COMMUNICATION PREFERENCE + LTE Data COMMUNICATION PREFERENCE | MAINTAIN SETTING OF VoIP COMMUNICATION WHEN LTE VoIP COMMUNICATION IS BEING EXECUTED, AT LEAST MAINTAIN CURRENT SETTING OF LTE Data COMMUNICATION OR INCREASE ACTIVATION LEVEL OF LTE Data COMMUNICATION WHEN OTHER COMMUNICATIONS ARE BEING EXECUTED AT THE SAME TIME | MAINTAIN SETTING OF LTE VoIP COMMUNICATION WHEN LTE VoIP COMMUNICATION IS BEING EXECUTED, INCREASE ACTIVATION LEVEL OF LTE Data COMMUNICATION WHEN OTHER COMMUNICATIONS ARE BEING EXECUTED AT THE SAME TIME | AT LEAST MAINTAIN CURRENT SETTING, OR DECREASE ACTIVATION LEVEL OF LTE Data COMMUNICATION WHEN LTE Data COMMUNICATION IS BEING EXECUTED |
| ISM COMMUNICATION PREFERENCE | AT LEAST MAINTAIN CURRENT SETTING, OR DECREASE ACTIVATION LEVEL OF LTE COMMUNICATION | AT LEAST MAINTAIN CURRENT SETTING, OR INCREASE ACTIVATION LEVEL OF LTE COMMUNICATION | DECREASE ACTIVATION LEVEL OF LTE COMMUNICATION |

FIG. 18A

|  | MUTUAL INTERFERENCE | ONLY LTE DEGRADATION | ONLY ISM DEGRADATION |
|---|---|---|---|
| LTE COMMUNICATION PREFERENCE | SET AS X=1 | SET AS X=1 | - |
| ISM COMMUNICATION PREFERENCE | SET AS X=0 | - | SET AS X=0 |

FIG. 18B

|  | MUTUAL INTERFERENCE | ONLY LTE DEGRADATION | ONLY ISM DEGRADATION |
|---|---|---|---|
| LTE COMMUNICATION PREFERENCE | DECREASE FREQUENCY OF AUTONOMOUS DENIAL OF LTE COMMUNICATION | DECREASE FREQUENCY OF AUTONOMOUS DENIAL OF LTE COMMUNICATION | - |
| ISM COMMUNICATION PREFERENCE | INCREASE FREQUENCY OF AUTONOMOUS DENIAL OF LTE COMMUNICATION | - | INCREASE FREQUENCY OF AUTONOMOUS DENIAL OF LTE COMMUNICATION | ially and explanatory and are not restrictive of the inven-
WIRELESS COMMUNICATION METHOD, WIRELESS COMMUNICATION SYSTEM, BASE STATION, AND WIRELESS TERMINAL

CROSS-REFERENCE TO RELATED APPLICATION

This application is a continuation application of U.S. application Ser. No. 14/594,549, filed Jan. 12, 2015, which is a continuation of International Application PCT/JP2012/004641, filed on Jul. 20, 2012, the entire contents of which are incorporated herein by reference.

FIELD

The present invention relates to a wireless communication method, a wireless communication system, a base station, and a wireless terminal.

BACKGROUND

In recent years, next-generation wireless communication technologies are discussed regarding a wireless communication system such as a mobile phone system, in order to realize a higher speed and larger capacity of the wireless communication. For example, in the Third Generation Partnership Project (3GPP) as a standardization organization, a communication standard called long term evolution (LTE) and a communication standard called LTE-Advanced (LTE-A) which is standardized based on the LTE wireless communication technology have been proposed.

In such a wireless communication system, a plurality of wireless communications may be executed with one wireless terminal, for example. The plurality of wireless communications, for example, indicate wireless communications with different methods, and include LTE communication, wireless local area network (LAN), and the like. In this case, circuits corresponding to each of the plurality of wireless communications are provided in one wireless terminal, for example. Such a state is, for example, referred to as in-device co-existence (IDC).

CITATION LIST

Non Patent Literature

NPL: 3GPP TR 36.816 V11.2.0 (2011-12)

SUMMARY

According to an aspect of the invention, a wireless communication method includes: transmitting, by a wireless terminal executing a plurality of wireless communications, first assistance information for assisting in control of interference to a base station, according to occurrence of the interference in the wireless terminal; receiving, by the base station, the first assistance information from the wireless terminal and transmitting control information relating to the plurality of wireless communications to the wireless terminal; and performing, by the wireless terminal, measurement for the control of the interference and transmitting second assistance information for assisting in the control of the interference.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 13A and 13B are tables illustrating operation examples of a wireless communication system according to the second embodiment.

FIGS. 14A and 14B are tables illustrating operation examples of a wireless communication system according to a third embodiment.

FIGS. 15A and 15B are tables illustrating operation examples of a wireless communication system according to a fourth embodiment.

FIGS. 16A and 16B are tables illustrating operation examples of a wireless communication system according to a fifth embodiment.

FIGS. 17A and 17B are tables illustrating operation examples of a wireless communication system according to a sixth embodiment.

FIGS. 18A and 18B are tables illustrating operation examples of a wireless communication system according to a seventh embodiment.

DESCRIPTION OF EMBODIMENTS

Hereinafter, embodiments of a wireless communication method, a wireless communication system, a base station, and a wireless terminal disclosed herein will be described with reference to the drawings. The wireless communication method, the wireless communication system, the base station, and the wireless terminal disclosed herein are not limited by the following embodiments.

While inventing the present embodiments, observations were made regarding a related art. Such observations include the following, for example.

In a wireless communication system of the related art, each wireless communication is assumed to perform wireless communications using the same or close frequency bands. At that time, when the wireless communications are simultaneously executed in a wireless terminal with the respective corresponding circuits, mutual interference may occur in the wireless terminal, and communication performance may be degraded.

The technology disclosed herein is made in view of such circumstances, and the embodiments disclosed herein, for example, provide a wireless communication method, a wireless communication system, a base station, and a wireless terminal which may suppress interference in a wireless terminal and improve communication performance with a wireless terminal executing a plurality of wireless communications.

(First Embodiment)

Figure 1:
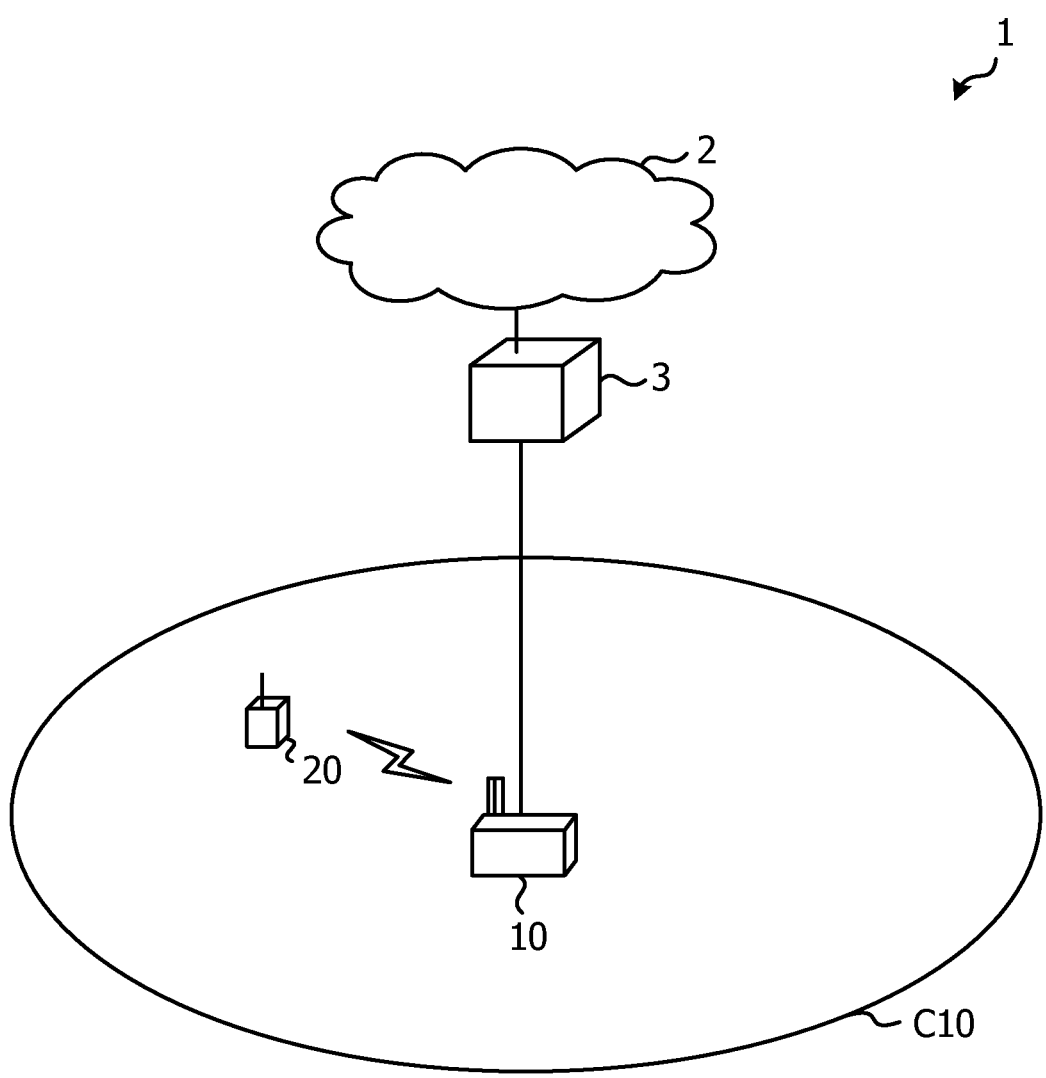
FIG. 1 is a diagram illustrating a configuration of a wireless communication system according to a first embodiment.

FIG. 1 illustrates a configuration of a wireless communication system 1 according to a first embodiment. As illustrated in FIG. 1, the wireless communication system 1 includes a base station 10 and a wireless terminal 20. The base station 10 forms a cell C10. The wireless terminal 20 exists in the cell C10.

The base station 10 is connected to a network device 3 by wired connection, and the network device 3 is connected to a network 2 by wired communication. The base station 10 is provided to transmit and receive data or control information to and from the other base station through the network device 3 and the network 2.

The network device 3, for example, includes a communication unit and a control unit, and each constituent element is connected so as to input and output a signal or data in one direction or bi-directionally. The network device 3 is, for example, realized by a gateway. As a hardware configuration of the network device 3, for example, the communication unit is realized by an interface circuit, and a control unit is realized by a processor and a memory.

The wireless terminal 20 performs communication with the base station 10 in a first wireless communication. In addition, the wireless terminal 20 performs communication with an access point or a communication device other than the base station 10 in a second wireless communication. As the first wireless communication, LTE or LTE-A is used, for example. As the second wireless communication, WiFi or Bluetooth (trademark registration) is used, for example.

The first wireless communication and the second wireless communication are performed using the same or close frequency bands. For example, a case where a frequency band group prepared in the first wireless communication and a frequency band group prepared in the second wireless communication are close to each other, or a case where the first wireless communication and the second wireless communication use the same frequency band group is assumed.

Figure 2:
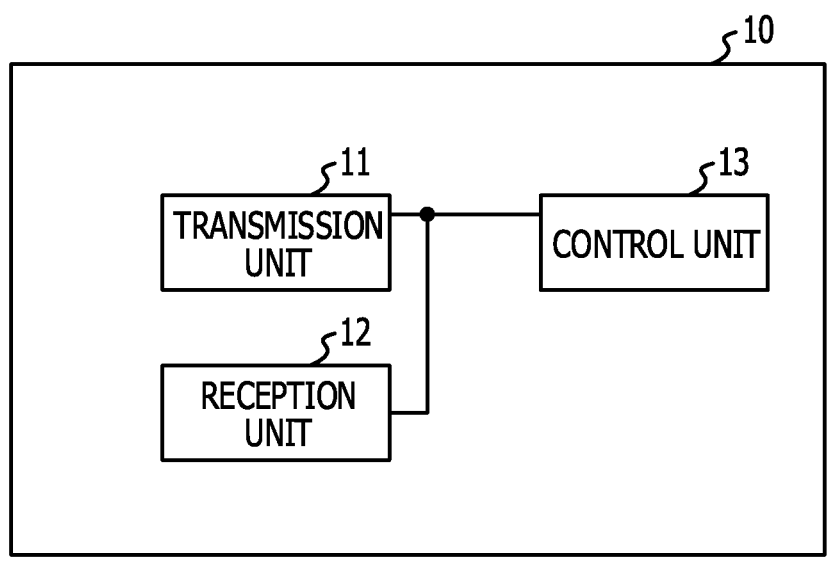
FIG. 2 is a functional block diagram illustrating a configuration of a base station according to the first embodiment.

FIG. 2 is a functional block diagram illustrating a configuration of the base station 10. As illustrated in FIG. 2, the base station 10 includes a transmission unit 11, a reception unit 12, and a control unit 13. Each constituent element is connected so as to input and output a signal or data in one direction or bi-directionally.

The transmission unit 11 transmits a data signal or a control signal through an antenna in the first wireless communication. The antenna may be commonly used for transmission and reception. The transmission unit 11 transmits a downlink signal through a downlink data channel or control channel, for example. A downlink physical data channel, for example, includes an individual data channel physical downlink shared channel (PDSCH). In addition, a downlink physical control channel, for example, includes an individual control channel physical downlink control channel (PDCCH). The transmitted signal, for example, includes a L1/L2 control signal to be transmitted to the connected wireless terminal 20 on the individual control channel or a radio resource control (RRC) control signal to be transmitted to the connected wireless terminal 20 on the individual data channel. The transmitted signal, for example, includes a reference signal used for channel estimation or demodulation. The transmitted signal, for example, includes control information relating to the wireless communication in the connected wireless terminal 20. The control information, for example, includes a cycle of scheduling of wireless resources used by the wireless terminal 20 or a cycle of discontinuous reception (DRX) in the wireless terminal 20.

The reception unit 12 receives a data signal or a control signal transmitted from the wireless terminal 20 through an antenna in the first wireless communication. The reception unit 12 receives an uplink signal through an uplink data channel or control channel, for example. An uplink physical data channel, for example, includes an individual data channel physical uplink shared channel (PUSCH). In addition, an uplink physical control channel, for example, includes an individual control channel physical uplink control channel (PUCCH). The received signal, for example, includes a reference signal used for channel estimation or demodulation. The received signal, for example, includes interference notification (IDC indication) transmitted from the wireless terminal 20 or information for assisting in the control of interference (assistance information). The interference notification, for example, notifies at least any of information indicating detection of occurrence of interference or an interference level.

The control unit 13 acquires the data or the control information from the network device 3 or the other base station by the wired connection or wireless connection. The control unit 13 outputs the transmitted data or control information to the transmission unit 11. The control unit 13 inputs the received data or control information from the reception unit 12.

The control unit 13 performs a control operation of receiving the information for assisting in the control of the interference (first assistance information) from the wireless terminal 20 and transmitting the control information relating to the wireless communication to the wireless terminal 20. The information for assisting in the control of the interference (first assistance information) is, for example, transmitted with the interference notification or to be included in the interference notification. When the information for assisting in the control of the interference is received, the control unit 13, for example, determines a wireless communication parameter as the control information relating to the wireless communication. When increasing an activation level of (when activating) the first wireless communication, the wireless communication parameter is, for example, set so as to set the cycle of the DRX shorter or to increase the frequency of the scheduling. When decreasing an activation level of the first wireless communication, the wireless communication parameter is, for example, set so as to set the cycle of the DRX longer or to decrease the frequency of the scheduling.

The control unit 13 performs a control operation of receiving the information for assisting in the control of the interference (second assistance information) based on a measurement result for controlling the interference, from the wireless terminal 20 and transmitting the control information relating to the wireless communication to the wireless terminal 20. When the information for assisting in the control of the interference received from the wireless terminal 20 is received, the control unit 13, for example, determines a wireless communication parameter as the control information relating to the wireless communication. As the information for assisting in the control of the interference, a wireless communication parameter (a pattern of the DRX or a frequency band of handover destination) which is determined based on the measurement result and is preferred by the wireless terminal 20 is used, for example. The control unit 13 performs the scheduling by reflecting the wireless communication parameter preferred by the wireless terminal 20 and transmits the wireless communication parameter to the wireless terminal 20. The control unit 13, for example, may receive the measurement result from the wireless terminal 20 and determine the wireless communication parameter. The control unit 13, for example, determines the pattern of the DRX or the frequency band of the handover destination, based on the measurement result.

Figure 3:
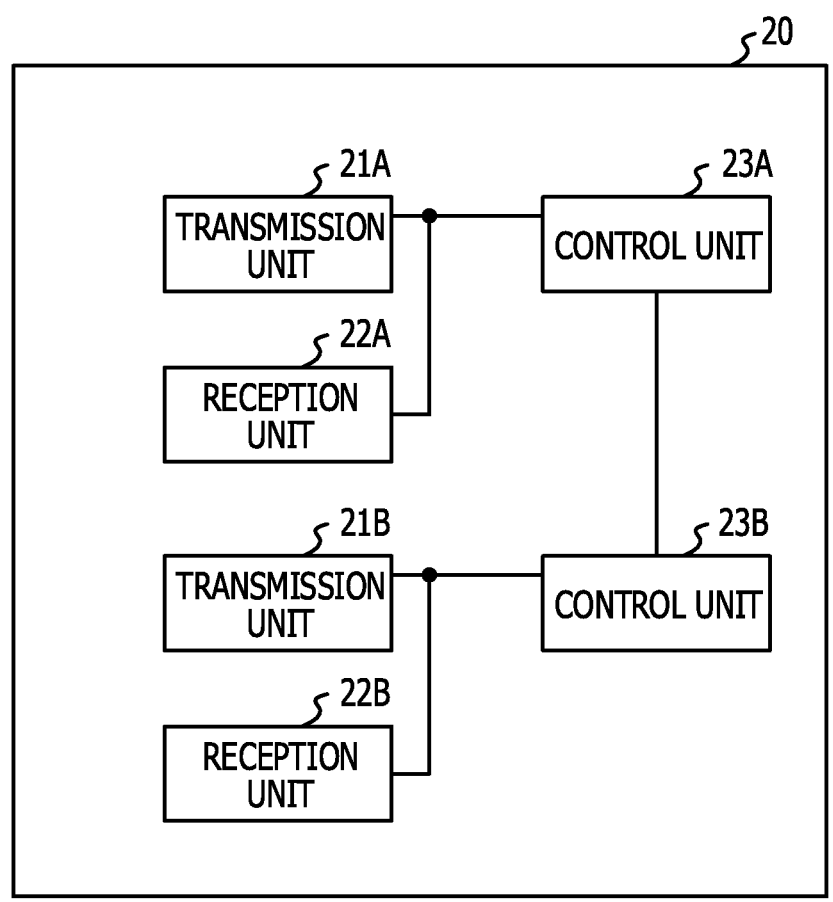
FIG. 3 is a functional block diagram illustrating a configuration of a wireless terminal according to the first embodiment.

FIG. 3 is a functional block diagram illustrating a configuration of the wireless terminal 20. As illustrated in FIG. 3, the wireless terminal 20 includes transmission units 21A and 21B, reception units 22A and 22B, and control units 23A and 23B. Each constituent element is connected so as to input and output a signal or data in one direction or bi-directionally.

The transmission unit 21A transmits a data signal or a control signal through an antenna in the first wireless communication. The antenna may be commonly used for transmission and reception. The transmission unit 21 receives an uplink signal through an uplink data channel or control channel, for example. The transmitted signal, for example, includes a reference signal used for channel estimation or demodulation, the interference notification indicating the occurrence of the interference, or the information for assisting in the control of the interference.

The reception unit 22A receives a data signal or a control signal transmitted from the base station 10 through an antenna in the first wireless communication. The received signal, for example, includes the reference signal used for channel estimation or demodulation or the control information relating to the wireless communication.

The control unit 23A detects the occurrence of the interference in the wireless terminal 20 due to the first wireless communication and the second wireless communication. The control unit 23A, for example, detects the occurrence of the interference in the first wireless communication (or determines the degradation of the communication performance in the first wireless communication), based on error characteristics of the received signal in the first wireless communication, when the first wireless communication and the second wireless communication are operated.

The control unit 23A acquires a detection result of the occurrence of the interference in the second wireless communication (or a determination result of the degradation of the communication performance in the second wireless communication) notified from the control unit 23B. The control unit 23A may acquire the error characteristics of the received signal from the control unit 23B and detect the occurrence of the interference in the second wireless communication (or determine the degradation of the communication performance in the second wireless communication).

When the occurrence of the interference is detected, the control unit 23A performs an interference control operation for removing the interference. There are various methods as the interference control operation, and these may be used in combination. In the interference control operation, a mode for independently performing the operation without cooperation between the first wireless communication side and the second wireless communication side of the wireless terminal 20, a mode for performing the operation with the cooperation between the first wireless communication side and the second wireless communication side of the wireless terminal 20, and a mode for performing the operation with the cooperation between the wireless terminal 20 and an external network such as the base station 10 is used, for example. For example, in the mode for performing the operation with the cooperation in the wireless terminal 20, a method of acquiring a difference between a signal of the first wireless communication and a signal of the second wireless communication, a method of performing time division between a communication timing of the first wireless communication and a communication timing of the second wireless communication, or a method of decreasing transmission power in the first wireless communication or the second wireless communication is used.

As the interference control operation, a (1) frequency division multiplexing (FDM) method, a (2) time division multiplexing (TDM) method, or a (3) autonomous denial method is particularly used.

In the FDM method, a frequency band currently used in the first wireless communication is handed over to a different frequency band.

In the TDM method, the first wireless communication and the second wireless communication are controlled so that the transmission on one side is not simultaneously executed with the reception on the other side. Specifically, the control operation is performed so that the pattern of the DRX in the first wireless communication is appropriate.

In the autonomous denial method, the wireless terminal 20 autonomously denies the transmission in the first wireless communication or the second wireless communication, when it is difficult to control the interference in the wireless terminal even when using the FDM method and the TDM method, for example. The frequency or level of the autonomous denial, for example, may be notified from the base station 10 or may be previously stored or adjusted in the wireless terminal 20.

When the occurrence of the interference is detected, the control unit 23A determines the information for assisting in the control of the interference. The control unit 23A performs a control operation of transmitting the interference notification and the information for assisting in the control of the interference to the base station 10. The information for assisting in the control of the interference, for example, includes information (preference information) indicating preference of the wireless terminal 20 regarding the plurality of wireless communications. The preference, for example, indicates precedence of the communication performance in the wireless communications in the wireless terminal 20, among the plurality of the wireless communications. For example, in a case of the first wireless communication preference, the communication performance of the first wireless communication has the precedence, and in a case of the second wireless communication preference, the communication performance of the second wireless communication has the precedence. The preference information is, for example, transmitted by being added to the interference notification as information of predetermined bits. The control unit 23A may transmit the preference information, information associating the preference information and the occurrence pattern of the interference, and information associating the preference information, the occurrence pattern of the interference, and types of a communication service (or types of traffic) being executed in the wireless terminal 20, to the base station 10, as the information for assisting in the control of the interference, for example.

When the occurrence of the interference is detected, the control unit 23A executes a measurement process for the control of the interference. The control unit 23A, for example, detects the reference signal from the base station 10 in the frequency band different from the frequency band currently used, and measures a received signal level (different frequency measurement). The received signal level, for example, includes received power or received quality. As the received signal level, reference signal received power (RSRP), reference signal received quality (RSRQ=received power value/total power value), signal-to-interference ratio (SIR), signal-to-interference and noise ratio (SINR), or the like is used, for example.

The control unit 23A performs the interference control operation by receiving the control information relating to the wireless communication transmitted from the base station 10 according to the information for assisting in the control of the interference transmitted before completing the measurement process, and executing the wireless communication using this control information. In addition, the control unit 23A performs the interference control operation by receiving the control information relating to the wireless communication transmitted from the base station 10 according to the measurement result, and executing the wireless communication using this control information.

The transmission unit 21B transmits a data signal or a control signal through an antenna in the second wireless communication. The antenna may be commonly used for transmission and reception.

The reception unit 22B receives a data signal or a control signal transmitted from the base station through an antenna in the second wireless communication.

The control unit 23B outputs the transmitted data or control information to the transmission unit 21. The control unit 23 inputs the received data or control information from the reception unit 22.

The control unit 23B, for example, detects the occurrence of the interference in the second wireless communication (or determines the degradation of the communication performance in the second wireless communication), based on error characteristics of the received signal in the second wireless communication, when the first wireless communication and the second wireless communication are operated.

The control unit 23B notifies the measured received signal level to the control unit 23A. The control unit 23B may determine the degradation of the communication performance in the second wireless communication based on the measured received signal level, and notify the determination result to the control unit 23A.

Figure 4:
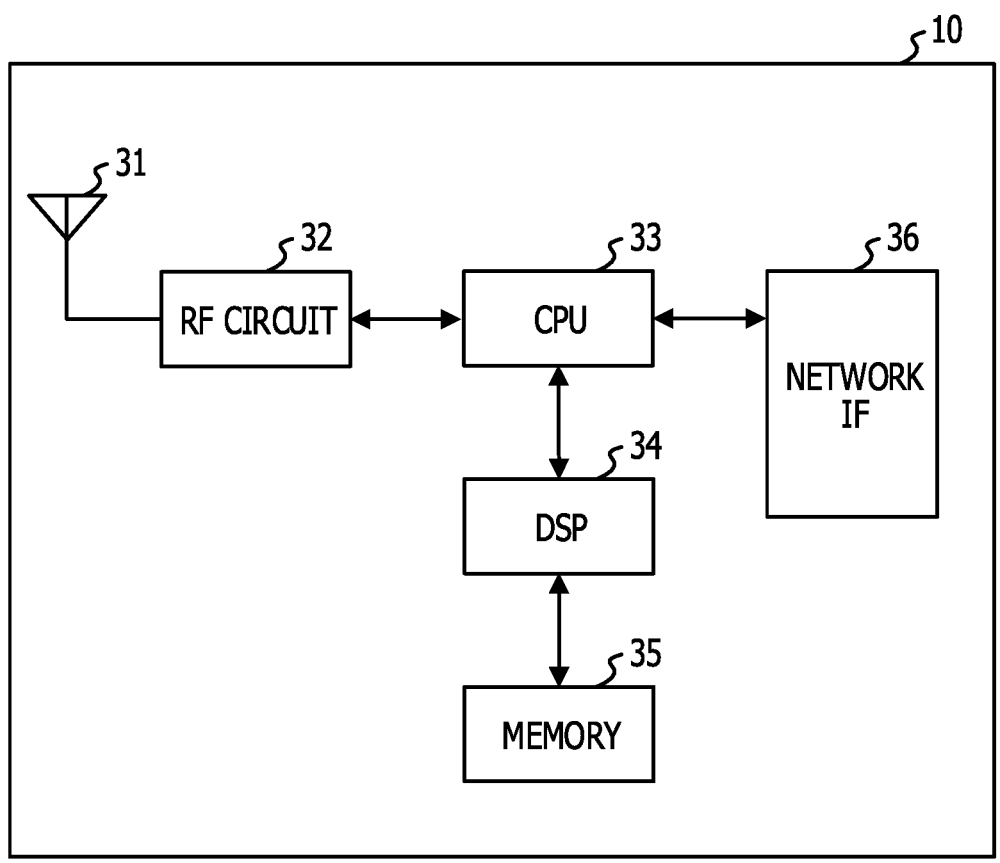
FIG. 4 is a diagram illustrating a hardware configuration of a base station according to the first embodiment.

FIG. 4 is a diagram illustrating a hardware configuration of the base station 10. As illustrated in FIG. 4, the base station 10, for example, includes a radio frequency (RF) circuit 32 including an antenna 31, a central processing unit (CPU) 33, a digital signal processor (DSP) 34, a memory 35, and a network interface (IF) 36, as constituent elements of the hardware. The CPU is connected so as to input and output various signals or data items through the network IF 36 such as a switch. The memory 35, for example, includes at least any of a random access memory (RAM) such as a synchronous dynamic random access memory (SDRAM), a read only memory (ROM), and a flash memory, and stores a program, control information, or data. The transmission unit 11 and the reception unit 12 are, for example, realized by the RF circuit 32, or the antenna 31 and the RF circuit 32. The control unit 13 is, for example, realized by an integrated circuit such as the CPU 33 or an integrated circuit such as the DSP 34.

Figure 5:
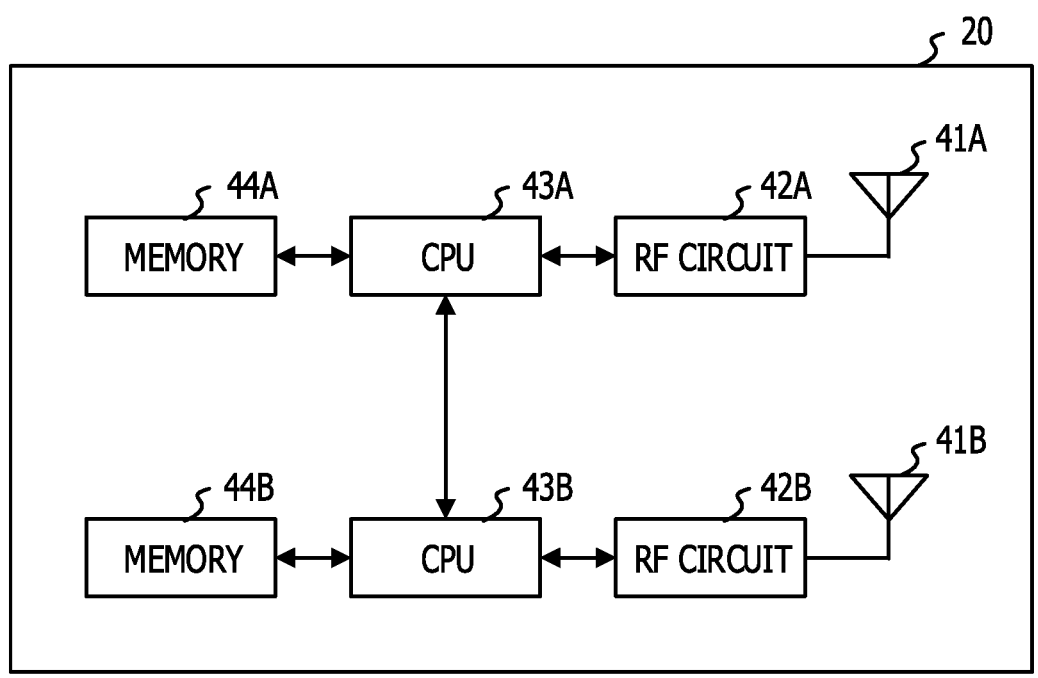
FIG. 5 is a diagram illustrating a hardware configuration of a wireless terminal according to the first embodiment.

FIG. 5 is a diagram illustrating a hardware configuration of the wireless terminal 20. As illustrated in FIG. 5, the wireless terminal 20, for example, includes RF circuits 42A and 42B respectively including antennas 41A and 41B, CPUs 43A and 43B, and memories 44A and 44B, as constituent elements of the hardware. The wireless terminal 20 may further include a display device such as a liquid crystal display (LCD) connected to the CPU 43A and 43B. The memories 44A and 44B include at least any of a RAM such as an SDRAM, a ROM, and flash memory, and store a program, control information, or data. The transmission unit 21A and the reception unit 22A are, for example, realized by the RF circuit 42A, or the antenna 41A and the RF circuit 42A. The control unit 23A is, for example, realized by an integrated circuit such as the CPU 43A. In the same manner as described above, the transmission unit 21B and the reception unit 22B are, for example, realized by the RF circuit 42B, or the antenna 41B and the RF circuit 42B. The control unit 23B is, for example, realized by an integrated circuit such as the CPU 43B.

Figure 6:
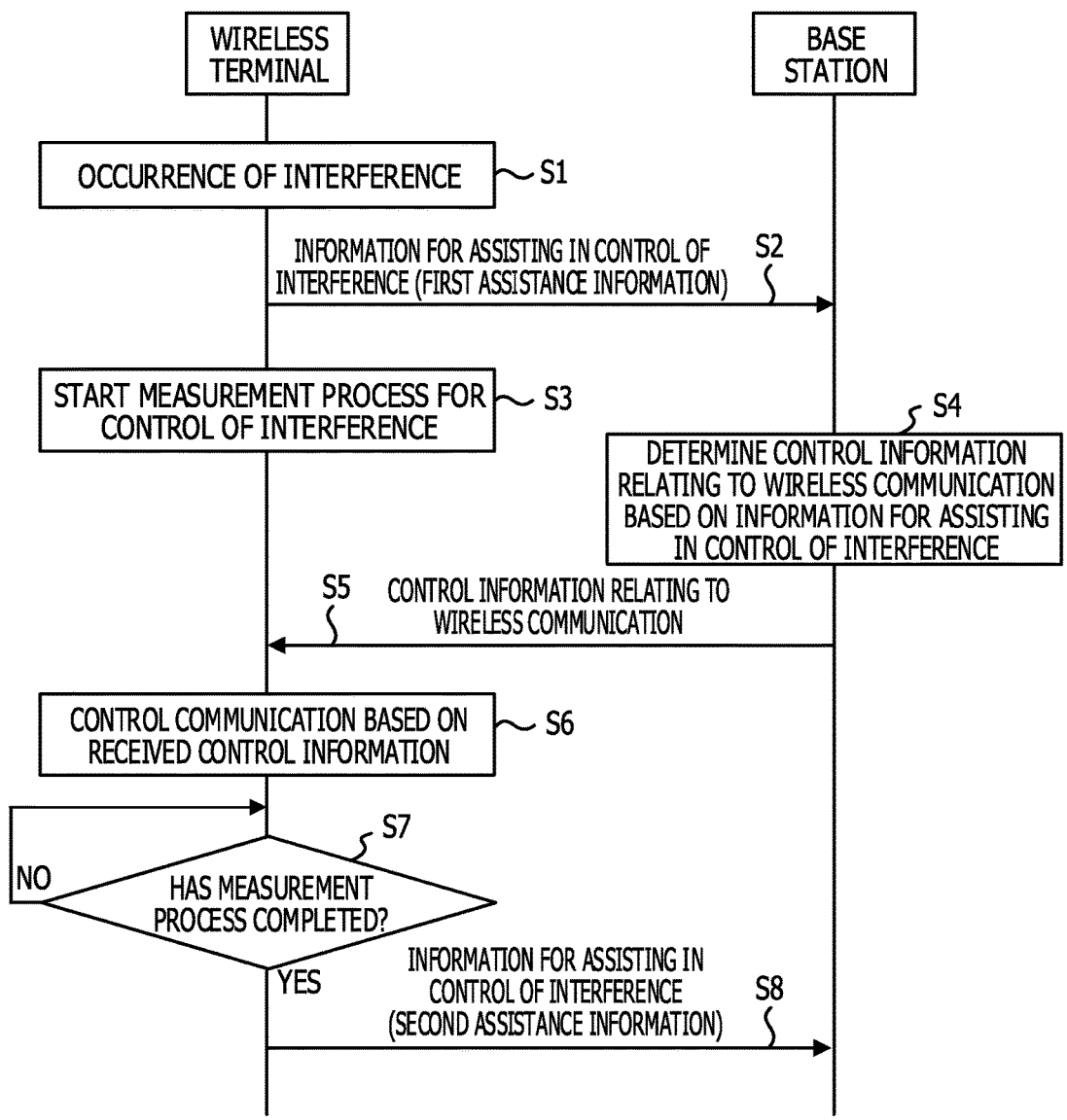
FIG. 6 is a sequence diagram for illustrating an operation of a wireless communication system according to the first embodiment.

Next, an operation of the wireless communication system 1 of the first embodiment will be described. FIG. 6 is a sequence diagram for illustrating the interference control operation of the wireless terminal 20, in the wireless communication system 1.

Herein, as a prior assumption, three methods of the interference control operation described above are reviewed. In the FDM method, the execution of the different frequency handover or the frequency of the handover destination is determined, based on the measurement result of the different frequency measurement. Time of several tens [ms] to several hundreds [ms] is, for example, asked for in the different frequency measurement. Accordingly, time is asked for until the handover from the frequency band currently used to the different frequency band is completed. Thus, time is asked for until the interference control operation functions. In the TDM method, time is asked for until the DRX pattern suitable for the interference control operation of the first wireless communication is detected. That is, time is asked for until the interference control operation functions. In the autonomous denial method, in order to arbitrarily deny the transmission by the wireless terminal, the communication with comparatively high quality of service (QoS) may be, for example, consecutively denied, and the communication performance is degraded. As described above, the rapid control operation is desired to avoid the degradation of the communication performance.

The example where the functions of the two different wireless communications are mounted has been described in FIG. 5, but the number thereof is not limited to two, and the functions of three or more wireless communications may be mounted.

Therefore, in the first embodiment, the interference control operation is performed in the wireless terminal 20 as described below.

As illustrated in FIG. 6, the wireless terminal 20 detects the occurrence of the interference (S1). Next, the wireless terminal 20 determines the information for assisting in the control of the interference (first assistance information) and transmits the interference notification and the information for assisting in the control of the interference to the base station 10 (S2). The information for assisting in the control of the interference, for example, includes the preference information of the wireless terminal 20 regarding the plurality of wireless communications. The information for assisting in the control of the interference is, for example, transmitted as an RRC control signal.

Next, the wireless terminal 20 starts the measurement process for the control of the interference (S3). In the measurement process, the received signal level at the different frequency is measured, for example.

With this, when the first assistance information is received, the base station 10 determines the control information relating to the wireless communication (wireless communication parameter) (S4). For example, the DRX cycle or the scheduling cycle is determined, as the wireless communication parameter.

Next, the base station 10 transmits the determined control information relating to the wireless communication (wireless communication parameter) to the wireless terminal 20 (S5). The wireless communication parameter is, for example, transmitted as RRC signaling transmitted on the PDSCH.

Next, the wireless terminal 20 controls the wireless communication, based on the received control information relating to the wireless communication (wireless communication parameter) (S6). Accordingly, the interference is controlled so as to remove the interference. As described above, since the interference control operation is started according to the first assistance information before the completion of the different frequency measurement, the interference control operation is rapidly executed and the communication performance is improved.

Next, the wireless terminal 20 determines whether or not the measurement process is completed (S7). When the measurement process is not completed (No of the determination result in S7), the process returns to S7, and the determination is performed at a predetermined timing from the continuation of the measurement process to the completion of the measurement process.

Meanwhile, when the measurement process is completed (No of the determination result in S7), the wireless terminal 20 determines the information for assisting in the control of the interference (second assistance information), based on the measurement result, and transmits the second assistance information to the base station 10.

When the second assistance information is received, the base station 10, for example, determines the control information relating to the wireless communication (wireless communication parameter) and transmits the wireless communication parameter to a wireless terminal 70, and the wireless communication may be controlled in the wireless terminal 70, based on the received wireless communication parameter. Accordingly, for example, the different frequency handover is executed, the DRX is executed with the appropriate DRX pattern, or the autonomous denial is executed at the appropriate frequency, and therefore the interference is controlled so as to avoid the occurrence of the interference. When the predetermined conditions are satisfied, the wireless terminal 20 may not perform the determination of the second assistance information and the transmission thereof to the base station 10.

As described above, according to the first embodiment, it is possible to control the interference in the wireless terminal 20 and to improve the communication performance with the wireless terminal 20 executing the plurality of wireless communications.

In the interference control operation described above, the wireless terminal 20 transmits the interference notification and the first assistance information once to the base station 10 until the occurrence of the interference is detected and the measurement process is completed, but the wireless terminal may repeatedly detect the occurrence of the interference and transmit the interference notification and the first assistance information multiple times, until the measurement process is completed. In addition, the wireless terminal 20 includes a timer or a counter, the number of times of the transmission of the interference notification and the first assistance information may be limited, for example, from the transmission of the first interference notification and the first assistance information until the predetermined time has elapsed or the predetermined number of times has been reached. For example, the number of times of the transmission (retransmission) is limited by an upper limit value N (N is an integer equal to or greater than 1), or the timer is controlled so as to perform the transmission (retransmission) only in a time period during timing. Accordingly, it is possible to avoid excessive retransmission of the interference notification and the first assistance information. The base station 10 may include a timer or a counter and notify the limitation of the transmission to the wireless terminal 20. The wireless terminal 20 may adjust the content of the first assistance information and the base station 10 may adjust the content of the control information determined in accordance with the first assistance information, according to the elapsed time or the number of times of the transmission from the first transmission of the first assistance information or according to the occurrence state of the interference.

When the measurement process is partially completed, the information for assisting in the control of the interference based on the measurement result may be determined based on the partial measurement result and transmitted to the base station 10.

(Second Embodiment)

A wireless communication system according to a second embodiment includes a base station 50 (illustrated in FIG. 7 which will be described later) and a wireless terminal 70 (illustrated in FIG. 8 which will be described later). The entire configuration of the wireless communication system according to the second embodiment is the same as that of the wireless communication system 1 illustrated in FIG. 1. The parts other than the base station 50 and the wireless terminal 70 of the wireless communication system have the same reference numerals, and the description thereof will be omitted.

In the wireless communication system 1 according to the second embodiment, the wireless terminal 70 exists in a cell in which a base station 50 is formed. The base station 50 is connected to the network device 3 by wired connection, and the network device 3 is connected to the network 2 by wired communication. The base station 50 is provided to transmit and receive data or control information to and from the other base station through the network device 3 and the network 2.

The wireless terminal 70 performs communication with the base station 50 in the first wireless communication. In addition, the wireless terminal 70 performs communication with an access point or a communication device other than the base station 50 in the second wireless communication. As the first wireless communication, LTE or LTE-A is used, for example. As the second wireless communication, WiFi or Bluetooth is used, for example.

Figure 7:
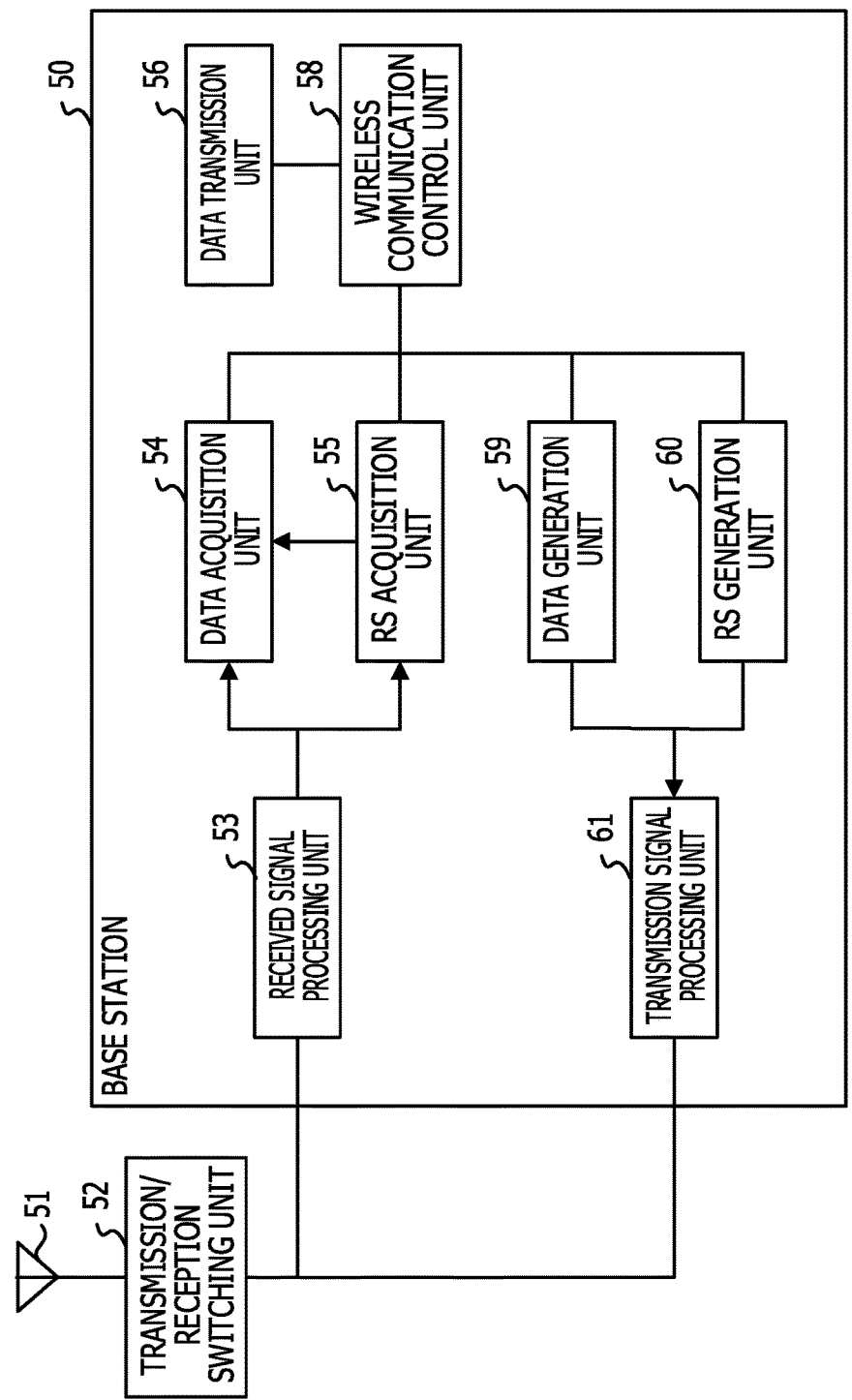
FIG. 7 is a functional block diagram illustrating a configuration of a base station of a wireless communication system according to a second embodiment.

FIG. 7 is a functional block diagram illustrating a configuration of the base station 50. As illustrated in FIG. 7, the base station 50 includes a transmission/reception antenna 51, a transmission/reception switching unit 52, a received signal processing unit 53, a data acquisition unit 54, and a reference signal (RS) acquisition unit 55. The base station 50 includes a data transmission unit 56 and a wireless communication control unit 58. The base station 50 includes a data generation unit 59, an RS generation unit 60, and a transmission signal processing unit 61. Each constituent element is connected so as to input and output a signal or data in one direction or bi-directionally.

In a case of the reception, the transmission/reception antenna 51 receives a wireless signal and outputs the wireless signal to the received signal processing unit 53. The transmission/reception antenna 51 receives the uplink signal through an uplink data channel or control channel, for example. A physical channel for receiving a signal, for example, includes a random access channel physical random access channel (PRACH) or PUSCH or PUCCH. The uplink signal, for example, includes an RACH signal, a reference signal used for channel estimation or demodulation, a control signal, or a data signal transmitted from the wireless terminal in a random access procedure. The control signal, for example, includes interference notification transmitted from the wireless terminal 70, information for assisting in control of interference, or a measurement result for control of the interference.

In a case of the transmission, the transmission/reception antenna 51 transmits the wireless signal input from the transmission signal processing unit 61. The transmission/reception antenna 51 transmits a downlink signal through a downlink data channel or control channel, for example. A physical channel for transmitting a signal, for example, includes a synchronization channel physical synchronization channel (PSCH), a broadcast channel physical broadcast channel (PBCH), a PDSCH, and a PDCCH. The downlink signal includes a reference signal used for channel estimation or demodulation, a control signal, or a data signal. As the control signal, for example, L1/L2 signaling to be transmitted to the connected wireless terminal 70 on the individual control channel, or RRC signaling to be transmitted to the connected wireless terminal 70 on the individual data channel is used. The control signal, for example, includes system information which is stored in a master information block (MIB) or a system information block (SIB) and is transmitted on the broadcast channel or a shared channel designated by the broadcast channel. The control signal, for example, includes control information relating to the wireless communication in the connected wireless terminal 70. The control information, for example, includes a cycle of scheduling of wireless resources used by the wireless terminal 70 or a cycle of DRX in the wireless terminal 70. The control information is, for example, notified at a timing when the connection is established or a predetermined control timing.

The transmission/reception switching unit 52 switches the transmission and reception of the transmission/reception antenna 51. The antenna may be separated bodies regarding the transmission and the reception. The plurality of antennas may be included.

The received signal processing unit 53 performs a wireless process such as an analog-to-digital (A/D) conversion or a digital signal process such as an FFT process, with respect to the received signal. The received signal processing unit 53 outputs the received data signal or control signal to the data acquisition unit 54. The received signal processing unit 53 outputs the received reference signal to the RS acquisition unit 55.

The data acquisition unit 54 performs a demodulation process or a decoding process, with respect to the received data signal or control signal. The data acquisition unit 54, for example, performs a demodulation process, based on the control information notified or stored in advance, and the reference signal for the demodulation process. The data acquisition unit 54 performs a decoding process of the demodulated signal, based on a channel estimation value estimated from the control information notified or stored in advance and the reference signal for the channel estimation. The data acquisition unit 54 performs a reordering process of the decoded signal and acquires the data.

The RS acquisition unit 55 outputs the reference signal for the demodulation to the data acquisition unit 54. The RS acquisition unit 55 outputs the channel estimation value estimated from the control information notified or stored in advance and the reference signal for the channel estimation, to the data acquisition unit 54. The RS acquisition unit 55 outputs the received signal level acquired from the reference signal to the wireless communication control unit 58.

The data transmission unit 56 transmits the data or the control information input from the data acquisition unit 54 to the network device 3. The data transmission unit 56 inputs the data or the control information transmitted from the network device 3. The data transmission unit 56 outputs the transmitted data or the control information to the data generation unit 59.

The wireless communication control unit 58 performs scheduling such as allocation of wireless resources to the wireless terminal 70. The wireless communication control unit 58, for example, performs a control operation of receiving the interference notification and the information for assisting in the control of the interference (first assistance information) from the wireless terminal 70 and transmitting the control information relating to the wireless communication to the wireless terminal 70. When the information for assisting in the control of the interference is received, the wireless communication control unit 58, for example, determines a wireless communication parameter. When increasing an activation level of (when activating) the first wireless communication, the wireless communication parameter is, for example, set so as to set the cycle of the DRX shorter or to increase the frequency of the scheduling. When decreasing an activation level of the first wireless communication, the wireless communication parameter is, for example, set so as to set the cycle of the DRX longer or to decrease the frequency of the scheduling.

The wireless communication control unit 58 performs a control operation of receiving the information for assisting in the control of the interference (second assistance information) based on a measurement result for controlling the interference, from the wireless terminal 70 and transmitting the control information relating to the wireless communication to the wireless terminal 70. When the information for assisting in the control of the interference received from the wireless terminal 70 is received, the wireless communication control unit 58, for example, determines a wireless communication parameter. As the information for assisting in the control of the interference, a wireless communication parameter (a pattern of the DRX or a frequency band of handover destination) which is determined based on the measurement result and is preferred by the wireless terminal 70 is used, for example. The wireless communication control unit 58 performs the scheduling by reflecting the wireless communication parameter preferred by the wireless terminal 20 and transmits the wireless communication parameter to the wireless terminal 70. The control unit 13, for example, may receive the measurement result from the wireless terminal 70 and determine the wireless communication parameter. The wireless communication control unit 58, for example, determines the pattern of the DRX or the frequency band of the handover destination, based on the measurement result.

The data generation unit 59 stores user data or control information in a predetermined signaling format. The data generation unit 59 performs an encoding process or a modulation process with respect to the user data or the control information stored in the signaling format and outputs the transmitted data to the transmission signal processing unit 60. The control information includes the broadcast information.

The RS generation unit 60 generates a reference signal used for data demodulation or channel estimation and outputs the reference signal to the transmission signal processing unit 61.

The transmission signal processing unit 61 generates a transmission signal and outputs the transmission signal to the transmission/reception antenna 51. The transmission signal processing unit 61, for example, performs allocation of an antenna port or wireless resources regarding the transmission data or the reference signal. The transmission signal processing unit 61, for example, performs a digital signal process, or a wireless process such as a digital-to-analog (D/A) conversion process and generates a transmission signal.

Figure 8:
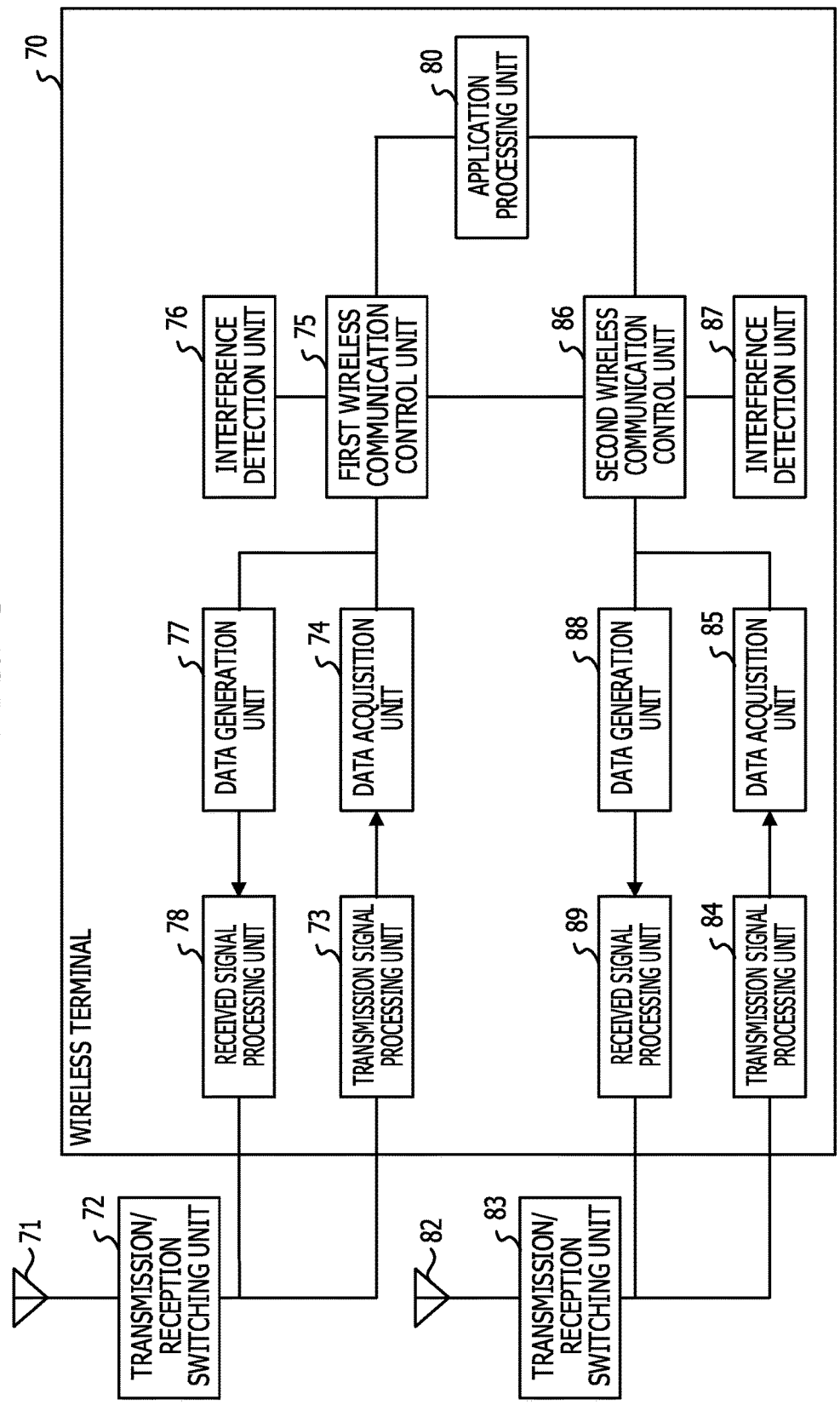
FIG. 8 is a functional block diagram illustrating a configuration of a wireless terminal of a wireless communication system according to the second embodiment.

FIG. 8 is a block diagram illustrating a functional configuration of the wireless terminal 70. As illustrated in FIG. 8, the wireless terminal 70 includes a transmission/reception antenna 71, a transmission/reception switching unit 72, a received signal processing unit 73, a data acquisition unit 74, a first wireless communication control unit 75, an interference detection unit 76, a data generation unit 77, a transmission signal processing unit 78, and an application processing unit 80. The wireless terminal 70 includes a transmission/reception antenna 82, a transmission/reception switching unit 83, a received signal processing unit 84, a data acquisition unit 85, a second wireless communication control unit 86, an interference detection unit 87, a data generation unit 88, and a transmission signal processing unit 89. Each constituent element is connected so as to input and output a signal or data in one direction or bi-directionally.

In a case of the reception, the transmission/reception antenna 71 receives a wireless signal in the first wireless communication and outputs the wireless signal to the received signal processing unit 73. The transmission/reception antenna 71 receives the downlink signal through the downlink data channel or control channel, for example. A physical channel for receiving a signal, for example, includes the PSCH, the PBCH, the PDSCH, or the PDCCH. The downlink signal, for example, includes a paging channel (PCH) used for simultaneous calling of the wireless terminal, the reference signal used for channel estimation or demodulation, the control signal, or the data signal. As the control signal, for example, L1/L2 signaling to be transmitted to the connected wireless terminal 70 on the individual control channel, or RRC signaling to be transmitted to the connected wireless terminal 70 on the individual data channel is used. The control signal, for example, includes control information relating to the wireless communication in the connected wireless terminal 70. The control information, for example, includes a cycle of scheduling of wireless resources used by the wireless terminal 70 or a cycle of DRX in the wireless terminal 70.

In a case of the transmission, the transmission/reception antenna 71 transmits the wireless signal input from the transmission signal processing unit 78 in the first wireless communication. The transmission/reception antenna 71 transmits the downlink signal through the downlink data channel or the control channel, for example. A physical channel for transmitting a signal, for example, includes the PRACH, the PUSCH, or the PUCCH. The uplink signal, for example, includes the RACH signal, the reference signal used for channel estimation or demodulation, the control signal, or the data signal. The control signal, for example, includes the interference notification transmitted from the wireless terminal 70, the information for assisting in the control of the interference, or the measurement result for the control of the interference.

The transmission/reception switching unit 72 switches the transmission and reception of the transmission/reception antenna 71. In the first wireless communication, the antenna may be separated bodies regarding the transmission and the reception. In the first wireless communication, the plurality of antennas may be included.

The received signal processing unit 73 performs a wireless process such as an A/D conversion or a digital signal process such as an FFT process, with respect to the received signal. The received signal processing unit 73 outputs the received data signal, control signal, reference signal, or PCH signal to the data acquisition unit 74.

The data acquisition unit 74 performs a demodulation process or a decoding process, with respect to the received data signal or control signal. The data acquisition unit 74, for example, performs a demodulation process, based on the control information notified or stored in advance, and the reference signal for the demodulation process. The data acquisition unit 74 performs a decoding process of the demodulated signal, based on a channel estimation value estimated from the control information notified or stored in advance and the reference signal for the channel estimation. The data acquisition unit 74 performs a reordering process of the decoded received signal and extracts the data or the control information. The control information, for example, includes the broadcast information.

The interference detection unit 76 detects the occurrence of the interference in the wireless terminal 70 by the first wireless communication and the second wireless communication. The interference detection unit 76, for example, detects the occurrence of internal interference in the first wireless communication. The interference detection unit 76, for example, detects the occurrence of the interference in the first wireless communication (or determines the degradation of the communication performance in the first wireless communication), based on error characteristics of the received signal in the first wireless communication, when the first wireless communication and the second wireless communication are operated.

The first wireless communication control unit 75 controls the wireless communication in the first wireless communication, according to the control information notified or stored in advance. When the occurrence of the interference is detected, the first wireless communication control unit 75 performs an interference control operation for removing the interference. As the interference control operation, the (1) FDM method, the (2) TDM method, or the (3) autonomous denial method is used, and these methods may be used in combination.

When the occurrence of the interference is detected, the first wireless communication control unit 75 determines the information for assisting in the control of the interference. The first wireless communication control unit 75 performs a control operation of transmitting the interference notification and the information for assisting in the control of the interference to the base station 50. The information for assisting in the control of the interference, for example, includes information (preference information) indicating preference of the wireless terminal 70 regarding the plurality of wireless communications. The preference information is, for example, information indicating precedence of the communication performance in the wireless communications in the wireless terminal 70, among the plurality of the wireless communications. For example, in a case of the first wireless communication preference, the communication performance of the first wireless communication has the precedence, and in a case of the second wireless communication preference, the communication performance of the second wireless communication has the precedence. The preference information is, for example, transmitted by being added to the interference notification as information of 1 bit.

When the occurrence of the interference is detected, the first wireless communication control unit 75 executes a measurement process for the control of the interference. The first wireless communication control unit 75, for example, detects the reference signal from the base station 50 in the frequency band different from the frequency band currently used, and measures the received signal level (different frequency measurement).

The first wireless communication control unit 75 performs the interference control operation by executing the wireless communication using the control information relating to the wireless communication, transmitted from the base station 50 according to the information for assisting in the control of the interference transmitted before completing the measurement process. The control information is, for example, a wireless communication parameter such as a cycle of scheduling of wireless resources used by the wireless terminal 70 or a cycle of DRX in the wireless terminal 70.

The first wireless communication control unit 75 receives the control information relating to the wireless communication, transmitted from the base station 50 according to the information for assisting in the control of the interference transmitted based on the measurement result, and performs the interference control operation by executing the wireless communication using this control information. The control information is, for example, a wireless communication parameter such as the pattern of the DRX or the frequency band of the handover destination.

The application processing unit 80 manages various applications such as a telephone call or data communication executed by the wireless terminal 70. The application processing unit 80 executes the first wireless communication and the second wireless communication according to the executed application. The application processing unit 80 notifies the communication service such as the telephone call or the data communication or a QoS level according to the executed application, to the first wireless communication control unit 75. The application processing unit 80 outputs the transmitted data to the data generation unit 77 or the data generation unit 88. The application processing unit 80 inputs the acquired received data to the data acquisition unit 74 or the data acquisition unit 85.

The data generation unit 77 stores the user data or the control information in a predetermined signaling format. The data generation unit 77 performs an encoding process or a modulation process with respect to the user data or the control information stored in the signaling format and outputs the transmitted data to the transmission signal processing unit 78. The data generation unit 77 generates a reference signal used for data demodulation or channel estimation and outputs the reference signal to the transmission signal processing unit 78. The data generation unit 77 generates a control signal and outputs the control signal to the transmission signal processing unit 78.

The transmission signal processing unit 78 generates a transmission signal and outputs the transmission signal to the transmission/reception antenna 71. The transmission signal processing unit 78, for example, performs allocation of an antenna port or wireless resources regarding the transmission data or the reference signal. The transmission signal processing unit 78, for example, performs a digital signal process, or a wireless process such as a digital-to-analog (D/A) conversion process and generates a transmission signal.

In a case of the reception, the transmission/reception antenna 82 receives a wireless signal in the second wireless communication and outputs the wireless signal to the received signal processing unit 84. In a case of the transmission, the transmission/reception antenna 82 transmits the wireless signal input from the transmission signal processing unit 89 in the second wireless communication.

The transmission/reception switching unit 83 switches the transmission and reception of the transmission/reception antenna 82. In the second wireless communication, the antenna may be separated bodies regarding the transmission and the reception. In the second wireless communication, the plurality of antennas may be included.

The received signal processing unit 84 performs a wireless process such as an A/D conversion or a digital signal process such as an FFT process, with respect to the received signal, and outputs the received data signal or control signal to the data acquisition unit 85.

The data acquisition unit 85 performs a demodulation process or a decoding process, with respect to the received data signal or control signal, and acquires the data or the control information.

The second wireless communication control unit 86 controls the wireless communication in the second wireless communication, according to the control information notified or stored in advance.

The interference detection unit 87, for example, detects the occurrence of internal interference in the second wireless communication. The interference detection unit 87, for example, detects the occurrence of the interference in the second wireless communication (or determines the degradation of the communication performance in the second wireless communication), based on error characteristics of the received signal in the second wireless communication, when the first wireless communication and the second wireless communication are operated. The interference detection unit 87, for example, outputs the error characteristics of the received signal or the detection result of the occurrence of the interference in the second wireless communication to the interference detection unit 76.

The data generation unit 88 performs an encoding process or a modulation process with respect to the user data or the control information and outputs the transmitted data to the transmission signal processing unit 89.

The transmission signal processing unit 89, for example, performs a digital signal process, or a wireless process such as a digital-to-analog (D/A) conversion process, generates a transmission signal, and outputs the transmission signal to the transmission/reception antenna 82.

A hardware configuration of the base station 50 is the same as the hardware configuration of the base station 10 of the first embodiment. The transmission/reception antenna 51, the transmission/reception switching unit 52, and the wireless process function of the received signal processing unit 53, and the wireless process function of the transmission signal processing unit 61 of the base station 50 are, for example, realized by the antenna and the RF circuit. The digital signal process function of the received signal processing unit 53, the digital signal process function of the transmission signal processing unit 61, the data acquisition unit 54, the RS acquisition unit 55, the data transmission unit 56, the wireless communication control unit 58, the a data generation unit 59, and the RS generation unit 60 of the base station 50 are, for example, realized by the integrated circuit such as the CPU.

A hardware configuration of the wireless terminal 70 is the same as the hardware configuration of the wireless terminal 20 of the first embodiment. The transmission/reception antenna 71, the transmission/reception switching unit 72, the wireless process function of the received signal processing unit 73, and the wireless process function of the transmission signal processing unit 89 of the wireless terminal 70 are, for example, realized by the antenna and the RF circuit. The digital signal process function of the received signal processing unit 73, the digital signal process function of the transmission signal processing unit 89, the data acquisition unit 74, the first wireless communication control unit 75, the interference detection unit 76, the data generation unit 77, the application processing unit 80, the data acquisition unit 85, the second wireless communication control unit 86, the interference detection unit 87, and the data generation unit 88 of the wireless terminal 70 are, for example, realized by the integrated circuit such as the CPU.

Figure 12:
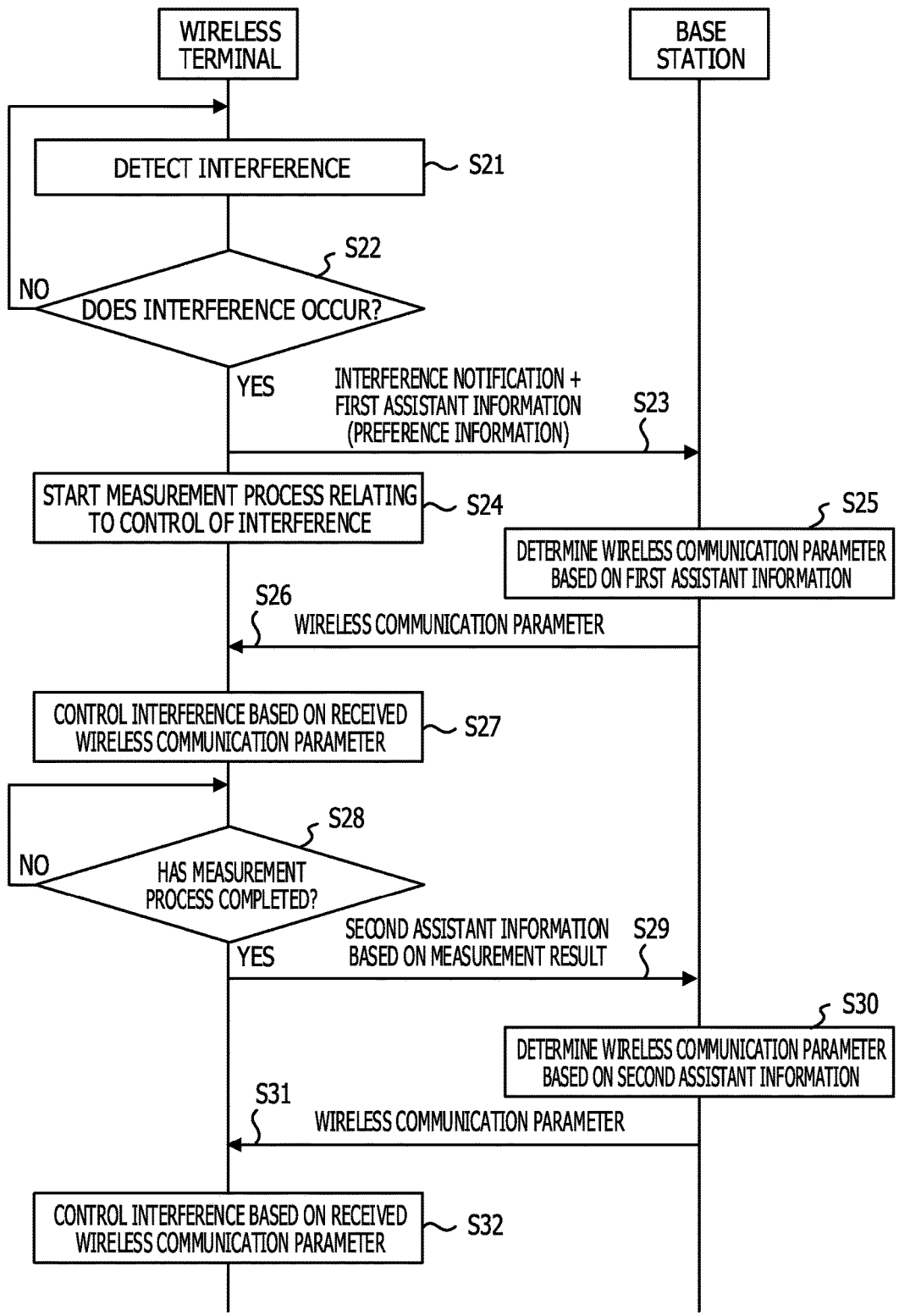
FIG. 12 is a sequence diagram for illustrating an operation of a wireless communication system according to the second embodiment.

Next, an operation of the wireless communication system of the second embodiment will be described. FIG. 12 is a sequence diagram for illustrating the interference control operation of the wireless terminal 70 in the wireless communication system.

Figure 9:
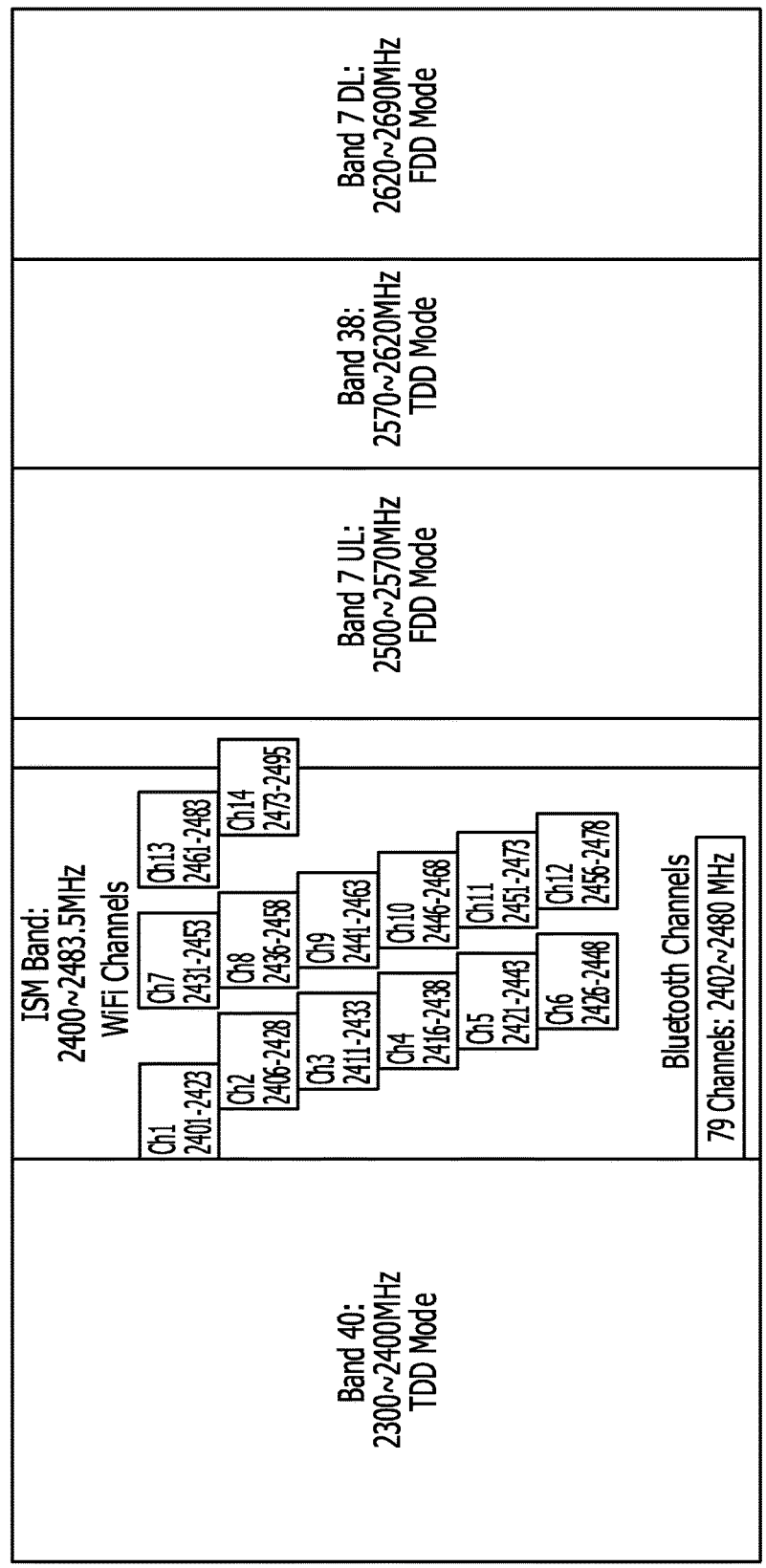
FIG. 9 is a diagram illustrating an allocation example of frequency bands of a wireless communication system.

Herein, FIG. 9 illustrates an example of the frequency bands prepared in the first wireless communication and the second wireless communication. The first wireless communication and the second wireless communication are performed using the same or close frequency bands. For example, a frequency band group prepared in the first wireless communication and a frequency band group prepared in the second wireless communication are close to each other, the first wireless communication and a case in which the second wireless communication use the same frequency band group is assumed. For example, the industry science medical (ISM) band (2400 MHz to 2483.5 MHz) is one of non-licensed bands and is used in Bluetooth or WiFi. At that time, Band 40 (2300 MHz to 2400 MHz) prepared in LTE-A TDD Mode and Band 7 (2500 MHz to 2570 MHz) prepared in LTE-A UL FDD Mode are frequency band groups adjacent to the ISM Band. In a case where the ISM Band is shared in the LTE-A, the same frequency band is used in the LTE-A or Bluetooth or WiFi.

Figure 10:
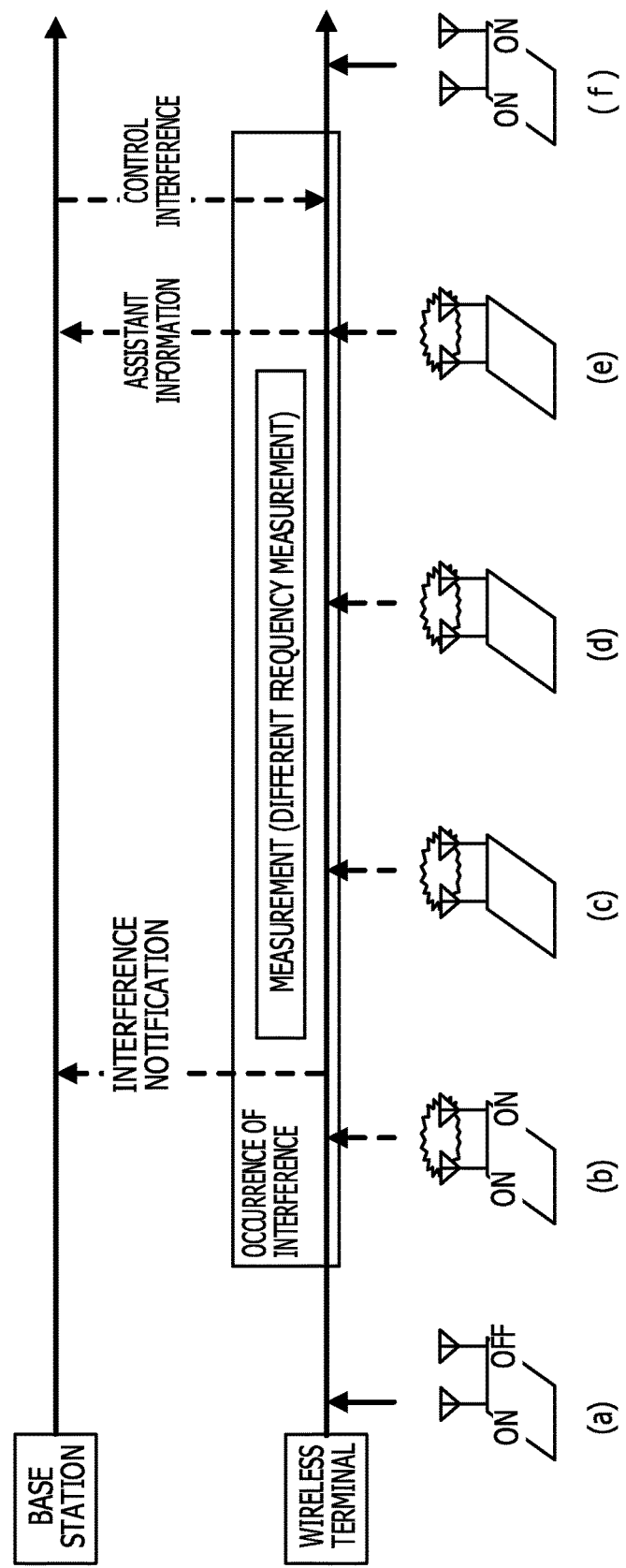
FIG. 10 is a diagram for illustrating an operation of a wireless communication system according to the second embodiment.

Next, FIG. 10 schematically illustrates the normal interference control operation as a comparative example. In FIG. 10, a horizontal axis indicates time. At time (a), the first wireless communication is turned on and the second wireless communication is turned off, and the interference does not occur. At time (b), the first wireless communication is turned on and the second wireless communication is turned on, the occurrence of the interference is detected, the interference notification is transmitted from the wireless terminal to the base station, and the different frequency measurement is started in the wireless terminal. At time (c) and time (d), the state where the interference occurred is continued while executing the different frequency measurement. At time (e), the different frequency measurement is completed, and the assistance information for assisting in the control of the interference is transmitted to the base station based on the measurement result. The assistance information is, for example, the preferred wireless communication parameter, and is the different frequency information used in the FDM method or the DRX pattern used in the TDM method. At this time (e), the state where the interference occurred is still continued. When the assistance information is received, the wireless communication parameter is determined in the base station, this wireless communication parameter is transmitted from the base station to the wireless terminal, and the interference control operation is started by the FMD method or the TDM method. Accordingly, at time (f), the state is changed to the state where the interference does not occur. In this example, the state where the interference occurred is continued during the measurement, and time is asked for until the interference control operation functions.

Figure 11:
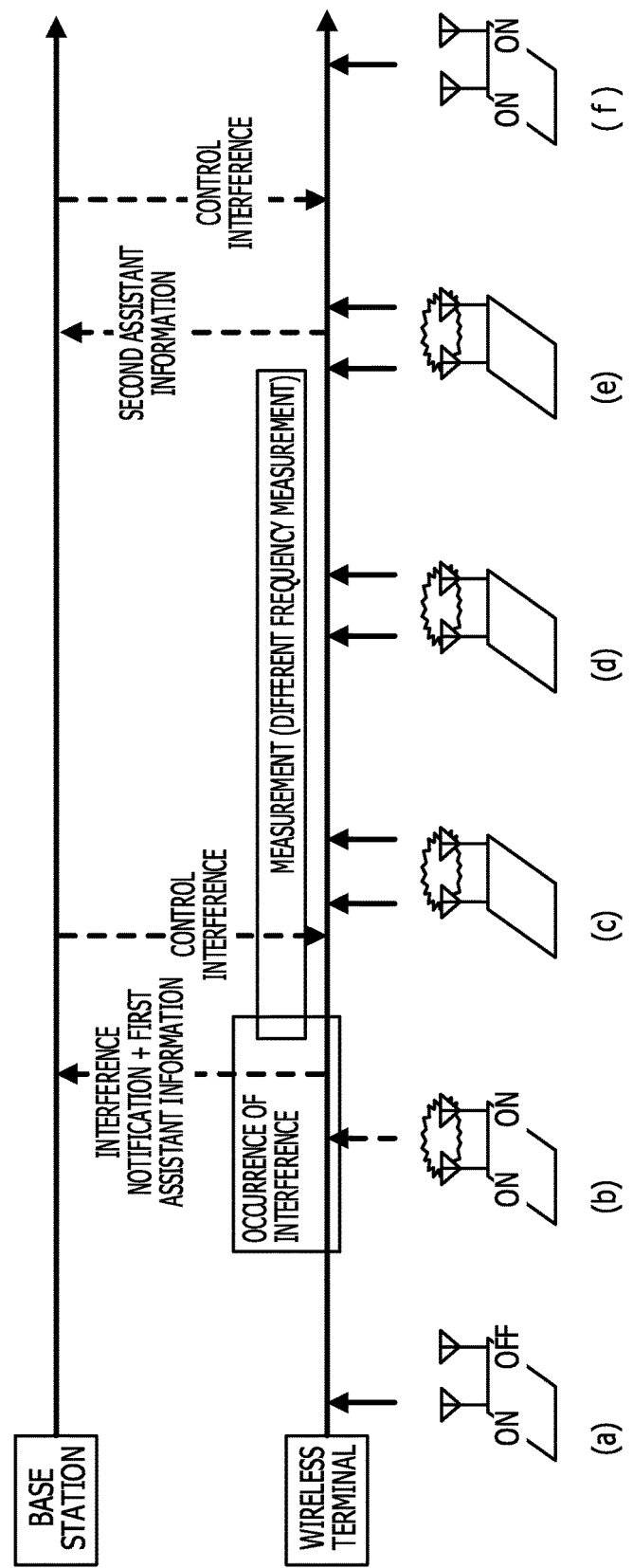
FIG. 11 is a diagram for illustrating an operation of a wireless communication system according to the second embodiment.

Meanwhile, FIG. 11 schematically illustrates the interference control operation of the wireless terminal 70 of the second embodiment. In FIG. 11, a horizontal axis indicates time. At time (a), the first wireless communication is turned on and the second wireless communication is turned off, and the interference does not occur. At time (b), the first wireless communication is turned on and the second wireless communication is turned on, and the occurrence of the interference is detected. At that time, the interference notification and the first assistance information for assisting in the control of the interference are transmitted from the wireless terminal 70 to the base station 50. The different frequency measurement is started in the wireless terminal 70. The first assistance information, for example, includes the preference information indicating preference of the communication performance among the first wireless communication and the second wireless communication, and the base station 50 may determine the wireless communication parameter for the interference control operation according to this information. This wireless communication parameter is transmitted from the base station 50 to the wireless terminal 70 and the interference control operation is started. At time (c) and time (d), even when the execution of the different frequency measurement is in progress, the interference control operation is started early, and accordingly the state is changed to a state where the interference is decreased or avoided. At time (e), the different frequency measurement is completed, and the second assistance information for assisting in the control of the interference is transmitted from the wireless terminal to the base station based on the measurement result. The second assistance information is, for example, the preferred wireless communication parameter, and is the different frequency information used in the FDM method or the DRX pattern used in the TDM method. At this time (e), the state where the interference is decreased is continued. When the second assistance information is received, the wireless communication parameter is determined in the base station 50, this wireless communication parameter is transmitted from the base station to the wireless terminal 70, and the interference control operation is started by the FMD method or the TDM method. Accordingly, at time (f), the state is changed to the state where the interference does not occur. In this example, since the interference control operation is started early even during the measurement, the state is changed to a state where the interference is decreased or avoided, and the communication performance is improved.

In the example illustrated in FIG. 11, the first assistance information, for example, may be set as the different frequency information used in the FDM method or the DRX pattern used in the TDM method, in addition to the preference information indicating precedence of the communication performance among the first wireless communication and the second wireless communication. This may be applied to a case where the measurement result is already obtained, for example, at the time when transmitting the first assistance information by the wireless terminal 70 (for example, a case where the measurement process relating to the control operation other than the interference control operation is performed and the measurement result is obtained at a comparatively close timing). The second control information may be set as the information including the different frequency information used in the FDM method or the DRX pattern used in the TDM method obtained by reflecting the measurement result obtained in the subsequent measurement. Herein, when the preference information of the wireless terminal 70 is changed from the time when the first assistance information is transmitted, the updated preference information may be included in the second assistance information. That is, the second assistance information may be set as the information with the updated first assistance information.

Returning to FIG. 12, the interference control operation of the wireless terminal 70 of the wireless communication system of the second embodiment will be described in detail. As a prior assumption, the LTE communication (LTE or LTE-A) is used as the first wireless communication, and the ISM communication (WiFi or Bluetooth) is used as the second wireless communication. A default value of the control information (wireless communication parameter) relating to the wireless communication is previously notified from the base station 50, for example, at a timing of the connection establishment, or is previously stored in the wireless terminal 70.

As illustrated in FIG. 12, the wireless terminal 70 executes a detection process of the occurrence of the interference (S21). Next, the wireless terminal 70 determines the occurrence of the interference (degradation of the communication performance) (S22). When the occurrence of the interference is not detected (No of the determination result in S22), the process returns to S21 and the detection of the interference is repeated at the predetermined timing. Meanwhile, when the occurrence of the interference is detected (Yes of the determination result in S22), the wireless terminal 70 determines the information for assisting in the control of the interference (first assistance information), and transmits the interference notification and the information for assisting in the control of the interference to the base station 50 (S23). This transmission is performed by the RRC signaling, for example. The first assistance information includes the preference information of the wireless terminal 70 regarding the plurality of the wireless communications.

Specifically, FIG. 13A illustrates a setting example of the first assistance information and FIG. 13B illustrates a setting example of the wireless communication parameter based on the first assistance information in FIG. 13A. In FIGS. 13A and 13B, "mutual interference" indicates that the occurrence of the interference (degradation of the communication performance) is detected in both of the LTE communication and the ISM communication, "only LTE degradation" indicates that the occurrence of the interference (degradation of the communication performance) is detected in the LTE communication, and "only ISM degradation" indicates that the occurrence of the interference (degradation of the communication performance) is detected in the ISM communication. "LTE communication preference" indicates preference of the wireless terminal 70 with respect to the LTE communication (precedence of the communication performance of the LTE communication), and "ISM communication preference" indicates preference of the wireless terminal 70 with respect to the ISM communication (precedence of the communication performance of the ISM communication).

In the example illustrated in FIGS. 13A and 13B, the information associating the preference information and the occurrence pattern of the interference is transmitted, as the first assistance information. Specifically, in a case of the "LTE communication preference" and the "mutual interference" or the "only LTE degradation", the first assistance information is set as X=1. In a case of the "ISM communication preference" and the "mutual interference" or the "only ISM degradation", the first assistance information is set as X=0. In a case of the "LTE communication preference" and the "only ISM degradation" or "ISM communication preference" and the "only LTE degradation", the first assistance information is not transmitted.

In the example illustrated in FIGS. 13A and 13B, the first assistance information is 1-bit control information and is transmitted by being added to the interference notification. At that time, the first assistance information may be transmitted only when satisfying predetermined conditions. The predetermined conditions, for example, include a case where the first assistance information to be transmitted exists, or a case where the communication performance of at least any of the plurality of wireless communications is degraded.

Next, the wireless terminal 70 starts the measurement process for the control of the interference (S24). In the measurement process, the received signal level at the different frequency is measured, for example.

With this, when the first assistance information is received, the base station 50 determines the wireless communication parameter (S25). For example, the DRX cycle or the scheduling cycle is determined, as the wireless communication parameter. With this wireless communication parameter, for example, the frequency of the downlink reception, the frequency of the corresponding uplink reception (for example, transmission of acknowledgement/negative acknowledgement (ACK/NACK)), reception intervals of downlink retransmission, or the position of the start of the DRX is adjusted.

Specifically, as illustrated in the FIG. 13B, in a case where first assistance information is set as X=1 ("LTE communication preference" and the "mutual interference" or the "only LTE degradation"), the base station 50 determines the wireless communication parameter so as to increase the activation level of the LTE communication. When increasing the activation level of (when activating) the LTE communication, the wireless communication parameter is, for example, set so as to set the cycle of the DRX shorter or to increase the frequency of the scheduling.

In a case where first assistance information is set as X=0 ("ISM communication preference" and the "mutual interference" or the "only ISM degradation"), the base station 50 determines the wireless communication parameter so as to decrease the activation level of the LTE communication. When decreasing the activation level of the LTE communication, the wireless communication parameter is, for example, set so as to set the cycle of the DRX longer or to decrease the frequency of the scheduling.

Next, the base station 50 transmits the determined wireless communication parameter to the wireless terminal 70 (S26). The wireless communication parameter is, for example, transmitted using the RRC signaling transmitted on the PDSCH.

Next, the wireless terminal 70 controls the communication based on the received wireless communication parameter (S27). Accordingly, the interference is controlled so that the interference is decreased or avoided. As described above, since the interference control operation is started according to the first assistance information before the completion of the different frequency measurement, the interference control operation is rapidly executed and the communication performance is improved.

Specifically, in a case of the preference of the wireless terminal 70 with respect to the LTE communication, the activation level of the LTE communication increases by controlling the LTE communication so as to set the cycle of the DRX shorter or to increase the frequency of the scheduling. In a case of the preference of the wireless terminal 70 with respect to the ISM communication, the activation level of the LTE communication decreases and the activation level of the ISM communication relatively increases by controlling the LTE communication so as to set the cycle of the DRX longer or to decrease the frequency of the scheduling. With such communication control operation, a difference occurs in the activation levels, and accordingly the interference is decreased or avoided and the communication performance is improved, at least regarding the preferred (precedent) communication of the wireless terminal 70.

Next, the wireless terminal 70 determines whether or not the measurement process is completed (S28). When the measurement process is not completed (No of the determination result in S28), the determination is performed at a predetermined timing from the continuation of the measurement process to the completion of the measurement process.

Meanwhile, when the measurement process is completed (No of the determination result in S28), the wireless terminal 70 determines the information for assisting in the control of the interference (second assistance information), based on the measurement result, and transmits the second assistance information to the base station 50 (S29). The second assistance information is, for example, the wireless communication parameter which is determined based on the measurement result and is preferred by the wireless terminal 70. As the wireless communication parameter preferred by the wireless terminal 70, the different frequency information (frequency band of handover destination) used in the FDM method, the DRX pattern used in the TDM method, or the frequency of autonomous denial used in the Auto denial method, is used, for example.

Next, when the second assistance information is received, the base station 50 determines the wireless communication parameter (S30). For example, the pattern of the DRX or the frequency band of different frequency handover destination is determined, as the wireless communication parameter.

Next, the base station 50 transmits the determined wireless communication parameter to the wireless terminal 70 (S31). The wireless communication parameter is, for example, transmitted using the RRC signaling transmitted on the PDSCH.

Next, the wireless terminal 70 controls the communication based on the received wireless communication parameter (S32). Accordingly, the interference is controlled so that the interference is avoided. Specifically, the occurrence of the interference is avoided by executing the different frequency handover, executing the DRX with the appropriate DRX pattern, or executing the autonomous denial at the appropriate frequency.

As described above, according to the second embodiment, it is possible to control the interference in the wireless terminal 70 and to improve the communication performance, with the wireless terminal 70 executing the plurality of wireless communications.

(Third Embodiment)

Next, a wireless communication system according to a third embodiment will be described. The entire configuration of the wireless communication system according to the third embodiment is the same as the configuration of the wireless communication system of the second embodiment. In the following description, the wireless communication system has the same reference numerals, and the description thereof will be omitted.

The operations relating to the determination of the first assistance information and the determination of the wireless communication parameter according to the first assistance information in the third embodiment are different from those of the second embodiment. FIGS. 14A and 14B are tables illustrating operation examples of the wireless communication system according to the third embodiment.

The operation relating to the first wireless communication control unit 75 of the wireless terminal according to the third embodiment is different from that of the wireless terminal 70 of the second embodiment.

In the third embodiment, when the occurrence of the interference is detected, the first wireless communication control unit 75 determines the information for assisting in the control of the interference (first assistance information). The first wireless communication control unit 75 performs a control operation of transmitting the interference notification and the information for assisting in the control of the interference to the base station 50. The information for assisting in the control of the interference, for example, includes information (preference information) indicating preference of the wireless terminal 70 regarding the plurality of wireless communications. At that time, the information associating the preference information and the occurrence pattern of the interference is transmitted as the first assistance information, so that the entire combination is divided.

Specifically, FIG. 14A illustrates a setting example of the first assistance information and FIG. 14B illustrates a setting example of the wireless communication parameter based on the first assistance information in FIG. 14A. In FIGS. 14A and 14B, "mutual interference" indicates that the occurrence of the interference (degradation of the communication performance) is detected in both of the LTE communication and the ISM communication, "only LTE degradation" indicates that the occurrence of the interference (degradation of the communication performance) is detected in the LTE communication, and "only ISM degradation" indicates that the occurrence of the interference (degradation of the communication performance) is detected in the ISM communication. "LTE communication preference" indicates preference of the wireless terminal 70 with respect to the LTE communication (precedence of the communication performance of the LTE communication), and "ISM communication preference" indicates preference of the wireless terminal 70 with respect to the ISM communication (precedence of the communication performance of the ISM communication).

In the example illustrated in FIGS. 14A and 14B, six types of information items associating the preference information and the occurrence pattern of the interference are transmitted, as the first assistance information, by being added to the interference notification, as 3-bit control information.

The other configuration of the wireless terminal according to the third embodiment is the same as the configuration of the wireless terminal 70 of the second embodiment. The hardware configuration of the wireless terminal according to the third embodiment is the same as the hardware configuration of the wireless terminal 70 of the second embodiment.

The operation relating to the wireless communication control unit 58 of the base station according to the third embodiment is different from that of the base station 50 of the second embodiment.

In the third embodiment, the wireless communication control unit 58 performs a control operation of receiving the interference notification and the information for assisting in the control of the interference (first assistance information) from the wireless terminal 70 and transmitting the control information relating to the wireless communication to the wireless terminal 70. When the information for assisting in the control of the interference is received, the wireless communication control unit 58, for example, determines a wireless communication parameter.

At that time, specifically, as illustrated in FIG. 14B, in a case where first assistance information is set as X=000 ("LTE communication preference" and the "mutual interference"), the base station 50 determines the wireless communication parameter so as to at least maintain the setting of the current wireless communication parameter or to increase the activation level of the LTE communication.

In a case where first assistance information is set as X=010 ("LTE communication preference" and the "only LTE degradation"), the base station 50 determines the wireless communication parameter so as to increase the activation level of the LTE communication. At that time, the activation level of the LTE communication may be increased to be greater than the case where the first assistance information is set as X=000 or 011.

In a case where first assistance information is set as X=100 ("LTE communication preference" and the "only ISM degradation"), the base station 50 determines the wireless communication parameter so as to at least maintain the setting of the current wireless communication parameter or to decrease the activation level of the LTE communication.

In a case where first assistance information is set as X=001 ("ISM communication preference" and the "mutual interference"), the base station 50 determines the wireless communication parameter so as to at least maintain the setting of the current wireless communication parameter or to decrease the activation level of the LTE communication.

In a case where first assistance information is set as X=011 ("ISM communication preference" and the "only LTE degradation"), the base station 50 determines the wireless communication parameter so as to at least maintain the setting of the current wireless communication parameter or to increase the activation level of the LTE communication.

In a case where first assistance information is set as X=101 ("ISM communication preference" and the "only ISM degradation"), the base station 50 determines the wireless communication parameter so as to decrease the activation level of the LTE communication. At that time, the activation level of the LTE communication may be increased to be greater than the case where the first assistance information is set as X=100 or 001.

When increasing an activation level of (when activating) the LTE communication, the wireless communication parameter is, for example, set so as to set the cycle of the DRX shorter or to increase the frequency of the scheduling.

When decreasing an activation level of the LTE communication, the wireless communication parameter is, for example, set so as to set the cycle of the DRX longer or to decrease the frequency of the scheduling.

For example, when the information indicating the interference level is included in the interference notification, whether to maintain the current setting or to change the activation level of the LTE communication may be determined according to the interference level.

The other configuration of the base station according to the third embodiment is the same as the configuration of the base station 50 of the second embodiment. The hardware configuration of the base station according to the third embodiment is the same as the hardware configuration of the base station 50 of the second embodiment.

Next, an operation of the wireless communication system of the third embodiment will be described. In the third embodiment, in the same manner as in S23 of the second embodiment, the first assistance information is determined as illustrated in FIGS. 14A and 14B, and is transmitted to the base station 50 with the interference notification. In the same manner as in S25 of the second embodiment, when the first assistance information is received, the base station 50 determines the wireless communication parameter. In the same manner as in S27 of the second embodiment, the wireless terminal 70 controls the communication based on the received wireless communication parameter. Accordingly, the interference is controlled so that the interference is decreased or avoided. As described above, since the interference control operation is started according to the first assistance information before the completion of the different frequency measurement, the interference control operation is rapidly executed and the communication performance is improved.

By performing the communication control operation using the wireless communication parameter determined as described above, the activation level or the precedence of the preferred wireless communication or the wireless communication service is relatively increased. Specifically, in a case of the preference of the wireless terminal 70 with respect to the LTE communication, the activation level of the LTE communication increases by controlling the LTE communication so as to set the cycle of the DRX shorter or to increase the frequency of the scheduling. In a case of the preference of the wireless terminal 70 with respect to the ISM communication, the activation level of the LTE communication decreases and the activation level of the ISM communication relatively increases by controlling the LTE communication so as to set the cycle of the DRX longer or to decrease the frequency of the scheduling. With such communication control operation, a difference occurs in the activation levels, and accordingly the interference is decreased or avoided and the communication performance is improved, at least regarding the preferred (precedent) communication of the wireless terminal 70.

At that time, since the six types of information items associating the preference information and the occurrence pattern of the interference are notified so as to be divided, it is possible to execute more detailed scheduling and determine a more appropriate wireless communication parameter, based on the six types of information items.

As described above, according to the third embodiment, it is possible to control the interference in the wireless terminal and to improve the communication performance, with the wireless terminal executing the plurality of wireless communications.

(Fourth Embodiment)

Next, a wireless communication system according to a fourth embodiment will be described. The entire configuration of the wireless communication system according to the fourth embodiment is the same as the configuration of the wireless communication system of the second embodiment. In the following description, the wireless communication system has the same reference numerals, and the description thereof will be omitted.

The operations relating to the determination of the first assistance information and the determination of the wireless communication parameter according to the first assistance information in the fourth embodiment are different from those of the second embodiment. FIGS. 15A and 15B are tables illustrating operation examples of the wireless communication system according to the fourth embodiment.

The operation relating to the first wireless communication control unit 75 of the wireless terminal according to the fourth embodiment is different from that of the wireless terminal 70 of the second embodiment.

In the fourth embodiment, when the occurrence of the interference is detected, the first wireless communication control unit 75 determines the information for assisting in the control of the interference (first assistance information). The first wireless communication control unit 75 performs a control operation of transmitting the interference notification and the information for assisting in the control of the interference to the base station 50. The information for assisting in the control of the interference, for example, includes information (preference information) indicating preference of the wireless terminal 70 regarding the plurality of wireless communications. At that time, the preference information, for example, includes information indicating the precedence of a communication service among a plurality of the communication services, when any of the wireless communication of the plurality of the wireless communications has the plurality of the communication services. Specifically, the preference information, for example, includes information indicating the precedence of the communication performance of the wireless communication among a voice over IP (VoIP) communication service and a data communication service in the LTE communication. For example, in a case of the LTE VoIP communication preference, the communication performance of the LTE VoIP communication is preceded, and in a case of the LTE VoIP communication preference+the LTE Data communication preference, the communication performance of both of the LTE VoIP communication and the LTE Data communication is preceded by the other communication.

That is, when the plurality of communication services are included in each of the wireless communications, the property (pattern) of the traffic of each communication service of the wireless communication may be already down or assumed. For example, when the VoIP communication service is performed in the LTE communication, the traffic arrival is performed cyclically (for example, 20 [ms]). In such a case, for example, the preference for each communication service is notified to the base station 50, and the wireless communication parameter is determined so as to remove the interference for each communication service in the base station 50, and accordingly, it is possible to perform the appropriate interference control operation.

As the preference information, the information with "RLC UM preference" and "RLC UM preference" may be notified instead of notifying the information with the "LTE VoIP communication preference" and the "LTE Data communication preference". For example, when the LTE VoIP communication is executed by the RLC UM and the LTE Data communication is executed by the RLC AM, the information with the "RLC UM preference" may be notified in a case of the preference with respect to the LTE VoIP communication, and the information with the "RLC UM preference+the RLC AM preference" may be notified in a case of the preference with respect to both the LTE VoIP communication and the LTE Data communication.

As the preference information, the information with "real time communication preference" and "real time communication preference" may be notified instead of notifying the information with the "LTE VoIP communication preference" and the "LTE Data communication preference". For example, the information with the "real time communication preference" may be notified in a case of the preference with respect to the LTE VoIP communication, and the information with the "real time communication preference+the real time communication preference" may be notified in a case of the preference with respect to both the LTE VoIP communication and the LTE Data communication.

Specifically, FIG. 15A illustrates a setting example of the first assistance information and FIG. 15B illustrates a setting example of the wireless communication parameter based on the first assistance information in FIG. 15A. In FIGS. 15A and 15B, "mutual interference" indicates that the occurrence of the interference (degradation of the communication performance) is detected in both of the LTE communication and the ISM communication, "only LTE degradation" indicates that the occurrence of the interference (degradation of the communication performance) is detected in the LTE communication, and "only ISM degradation" indicates that the occurrence of the interference (degradation of the communication performance) is detected in the ISM communication. The "LTE VoIP communication preference" indicates preference of the wireless terminal 70 with respect to the VoIP communication service in the LTE communication (precedence of the communication performance of the LTE VoIP communication), and the "LTE VoIP communication preference+the LTE Data communication preference" indicates preference of the wireless terminal 70 with respect to both of the VoIP communication service and the data communication service in the LTE communication (precedence of both communication performances).

In the example illustrated in FIGS. 15A and 15B, the information associating the preference information and the occurrence pattern of the interference is transmitted, as the first assistance information. In the example illustrated in FIGS. 15A and 15B, the first assistance information is 1-bit control information and is transmitted by being added to the interference notification. Specifically, in a case of the "LTE VoIP communication preference" and the "mutual interference" or the "only LTE degradation", the first assistance information is set as X=0. In a case of the "LTE VoIP communication preference+LTE Data communication preference" and the "mutual interference" or the "only LTE degradation", the first assistance information is set as X=1. In a case of the "only ISM degradation", the first assistance information is not transmitted.

The other configuration of the wireless terminal according to the fourth embodiment is the same as the configuration of the wireless terminal 70 of the second embodiment. The hardware configuration of the wireless terminal according to the fourth embodiment is the same as the hardware configuration of the wireless terminal 70 of the second embodiment.

The operation relating to the wireless communication control unit 58 of the base station according to the fourth embodiment is different from that of the base station 50 of the second embodiment.

In the fourth embodiment, the wireless communication control unit 58 performs a control operation of receiving the interference notification and the information for assisting in the control of the interference (first assistance information) from the wireless terminal 70 and transmitting the control information relating to the wireless communication to the wireless terminal 70. When the information for assisting in the control of the interference is received, the wireless communication control unit 58, for example, determines a wireless communication parameter.

At that time, specifically, as illustrated in FIG. 15B, in a case where first assistance information is set as X=0 ("LTE VoIP communication preference" and the "mutual interference" or the "only LTE degradation"), the base station 50 determines the wireless communication parameter so as to maintain the setting of the LTE VoIP when the LTE VoIP communication is being executed, and to lower the precedence of the other communication when the other communications are being executed at the same time.

In a case where first assistance information is set as X=1 ("LTE VoIP communication preference+the LTE Data communication preference" and the "mutual interference" or the "only LTE degradation"), the base station 50 determines the wireless communication parameter so as to maintain the setting of the LTE VoIP when the LTE VoIP communication is being executed, and to increase the activation level of the LTE Data communication when the other communication when the other communications are being executed at the same time.

When increasing the activation level of (when activating) the LTE communication, the wireless communication parameter is, for example, set so as to set the cycle of the DRX shorter or to increase the frequency of the scheduling. When decreasing the activation level of the LTE communication, the wireless communication parameter is, for example, set so as to set the cycle of the DRX longer or to decrease the frequency of the scheduling.

For example, when the information indicating the interference level is included in the interference notification, the amount of the precedence to be lowered or the amount of the activation level to be increased may be determined according to the interference level.

The other configuration of the base station according to the fourth embodiment is the same as the configuration of the base station 50 of the second embodiment. The hardware configuration of the base station according to the fourth embodiment is the same as the hardware configuration of the base station 50 of the second embodiment.

Next, an operation of the wireless communication system of the fourth embodiment will be described. In the fourth embodiment, in the same manner as in S23 of the second embodiment, the first assistance information is determined as illustrated in FIGS. 15A and 15B, and is transmitted to the base station 50 with the interference notification. In the same manner as in S25 of the second embodiment, when the first assistance information is received, the base station 50 determines the wireless communication parameter. In the same manner as in S27 of the second embodiment, the wireless terminal 70 controls the communication based on the received wireless communication parameter. Accordingly, the interference is controlled so that the interference is decreased or avoided. As described above, since the interference control operation is started according to the first assistance information before the completion of the different frequency measurement, the interference control operation is rapidly executed and the communication performance is improved.

By performing the communication control operation using the wireless communication parameter determined as described above, the activation level or the precedence of the preferred wireless communication or the wireless communication service is relatively increased. With such communication control operation, a difference occurs in the activation levels, and accordingly the interference is decreased or avoided and the communication performance is improved, at least regarding the preferred (precedent) communication of the wireless terminal 70.

As described above, according to the fourth embodiment, it is possible to control the interference in the wireless terminal and to improve the communication performance, with the wireless terminal executing the plurality of wireless communications.

(Fifth Embodiment)

Next, a wireless communication system according to a fifth embodiment will be described. The entire configuration of the wireless communication system according to the fifth embodiment is the same as the configuration of the wireless communication system of the second embodiment. The operations relating to the determination of the first assistance information and the determination of the wireless communication parameter according to the first assistance information in the fifth embodiment are different from those of the second embodiment. FIGS. 16A and 16B are tables illustrating operation examples of the wireless communication system according to the fifth embodiment. In the following description, the wireless communication system has the same reference numerals, and the description thereof will be omitted.

The operation relating to the first wireless communication control unit 75 of the wireless terminal according to the fifth embodiment is different from that of the wireless terminal 70 of the second embodiment.

In the fifth embodiment, when the occurrence of the interference is detected, the first wireless communication control unit 75 determines the information for assisting in the control of the interference (first assistance information). The first wireless communication control unit 75 performs a control operation of transmitting the interference notification and the information for assisting in the control of the interference to the base station 50. The information for assisting in the control of the interference, for example, includes information (preference information) indicating preference of the wireless terminal 70 regarding the plurality of wireless communications. At that time, in the same manner as in the third embodiment, the information associating the preference information and the occurrence pattern of the interference is transmitted as the first assistance information, so that the entire combination is divided. In addition, in the same manner as in the fourth embodiment, the preference information, for example, includes information indicating the precedence of a communication service among a plurality of the communication services, when any of the wireless communication of the plurality of the wireless communications has the plurality of the communication services. Specifically, the preference information, for example, includes information indicating the precedence of the communication performance of the wireless communication among a VoIP communication service and a data communication service in the LTE communication. For example, in a case of the LTE VoIP communication preference, the communication performance of the LTE VoIP communication is preceded, and in a case of the LTE VoIP communication preference+the LTE Data communication preference, the communication performance of both of the LTE VoIP communication and the LTE Data communication is preceded by the other communication.

Specifically, FIG. 16A illustrates a setting example of the first assistance information and FIG. 16B illustrates a setting example of the wireless communication parameter based on the first assistance information in FIG. 16A. In FIGS. 16A and 16B, "mutual interference" indicates that the occurrence of the interference (degradation of the communication performance) is detected in both of the LTE communication and the ISM communication, "only LTE degradation" indicates that the occurrence of the interference (degradation of the communication performance) is detected in the LTE communication, and "only ISM degradation" indicates that the occurrence of the interference (degradation of the communication performance) is detected in the ISM communication. The "LTE VoIP communication preference" indicates preference of the wireless terminal 70 with respect to the VoIP communication service in the LTE communication (precedence of the communication performance of the LTE VoIP communication), and the "LTE VoIP communication preference+the LTE Data communication preference" indicates preference of the wireless terminal 70 with respect to both of the VoIP communication service and the data communication service in the LTE communication (precedence of both communication performances).

In the example illustrated in FIGS. 16A and 16B, six types of information items associating the preference information and the occurrence pattern of the interference are transmitted, as the first assistance information, by being added to the interference notification, as 3-bit control information.

The other configuration of the wireless terminal according to the fifth embodiment is the same as the configuration of the wireless terminal 70 of the second embodiment. The hardware configuration of the wireless terminal according to the fifth embodiment is the same as the hardware configuration of the wireless terminal 70 of the second embodiment.

The operation relating to the wireless communication control unit 58 of the base station according to the fifth embodiment is different from that of the base station 50 of the second embodiment.

In the fifth embodiment, the wireless communication control unit 58 performs a control operation of receiving the interference notification and the information for assisting in the control of the interference (first assistance information) from the wireless terminal 70 and transmitting the control information relating to the wireless communication to the wireless terminal 70. When the information for assisting in the control of the interference is received, the wireless communication control unit 58, for example, determines a wireless communication parameter.

At that time, specifically, as illustrated in FIG. 16B, in a case where first assistance information is set as X=000 ("LTE VoIP communication preference" and the "mutual interference"), the base station 50 determines the wireless communication parameter so as to at least maintain the setting of the VoIP when the VoIP communication is being executed, and to at least maintain the current setting of the other communication or to lower the precedence of the other communication when the other communications are being executed at the same time.

In a case where first assistance information is set as X=010 ("LTE VoIP communication preference" and the "only LTE degradation"), the base station 50 determines the wireless communication parameter so as to maintain the setting of the VoIP when the VoIP communication is being executed, and to lower the precedence of the other communication when the other communications are being executed at the same time.

In a case where first assistance information is set as X=100 ("LTE VoIP communication preference" and the "only ISM degradation"), the base station 50 determines the wireless communication parameter so as to at least maintain the current setting, and to decrease the activation level of the LTE Data communication when the LTE Data communication is being executed.

In a case where first assistance information is set as X=001 ("LTE VoIP communication preference+the LTE Data communication preference" and the "mutual interference"), the base station 50 determines the wireless communication parameter so as to maintain the setting of the VoIP when the VoIP communication is being executed, and to at least maintain the current setting of the LTE Data communication or to increase the activation level of the LTE Data communication when the other communication when the other communications are being executed at the same time.

In a case where first assistance information is set as X=011 ("LTE VoIP communication preference+the LTE Data communication preference" and the "only LTE degradation"), the base station 50 determines the wireless communication parameter so as to maintain the setting of the VoIP when the VoIP communication is being executed, and to increase the activation level of the LTE Data communication when the other communication when the other communications are being executed at the same time.

In a case where first assistance information is set as X=101 ("LTE VoIP communication preference+the LTE Data communication preference" and the "only ISM degradation"), the base station 50 determines the wireless communication parameter so as to at least maintain the current setting, and to decrease the activation level of the LTE Data communication when the LTE Data communication is being executed.

When increasing the activation level of (when activating) the LTE communication, the wireless communication parameter is, for example, set so as to set the cycle of the DRX shorter or to increase the frequency of the scheduling. When decreasing the activation level of the LTE communication, the wireless communication parameter is, for example, set so as to set the cycle of the DRX longer or to decrease the frequency of the scheduling.

For example, when the information indicating the interference level is included in the interference notification, whether to maintain the current setting or to change the activation level of the LTE communication may be determined according to the interference level.

The other configuration of the base station according to the fifth embodiment is the same as the configuration of the base station 50 of the second embodiment. The hardware configuration of the base station according to the fifth embodiment is the same as the hardware configuration of the base station 50 of the second embodiment.

Next, an operation of the wireless communication system of the fifth embodiment will be described. In the fifth embodiment, in the same manner as in S23 of the second embodiment, the first assistance information is determined as illustrated in FIGS. 16A and 16B, and is transmitted to the base station 50 with the interference notification. In the same manner as in S25 of the second embodiment, when the first assistance information is received, the base station 50 determines the wireless communication parameter. In the same manner as in S27 of the second embodiment, the wireless terminal 70 controls the communication based on the received wireless communication parameter. Accordingly, the interference is controlled so that the interference is decreased or avoided. As described above, since the interference control operation is started according to the first assistance information before the completion of the different frequency measurement, the interference control operation is rapidly executed and the communication performance is improved.

By performing the communication control operation using the wireless communication parameter determined as described above, the activation level or the precedence of the preferred wireless communication or the wireless communication service is relatively increased. With such communication control operation, a difference occurs in the activation levels, and accordingly the interference is decreased or avoided and the communication performance is improved, at least regarding the preferred (precedent) communication of the wireless terminal 70.

At that time, since the six types of information items associating the preference information and the occurrence pattern of the interference are notified so as to be divided, it is possible to execute more detailed scheduling and determine a more appropriate wireless communication parameter, based on the six types of information items.

As described above, according to the fifth embodiment, it is possible to control the interference in the wireless terminal and to improve the communication performance, with the wireless terminal executing the plurality of wireless communications.

(Sixth Embodiment)

Next, a wireless communication system according to a sixth embodiment will be described. The entire configuration of the wireless communication system according to the sixth embodiment is the same as the configuration of the wireless communication system of the second embodiment. The operations relating to the determination of the first assistance information and the determination of the wireless communication parameter according to the first assistance information in the sixth embodiment are different from those of the second embodiment. The sixth embodiment is the combined operation of the third embodiment and the fifth embodiment. FIGS. 17A and 17B are tables illustrating operation examples of the wireless communication system according to the sixth embodiment. In the following description, the wireless communication system has the same reference numerals, and the description thereof will be omitted.

The operation relating to the first wireless communication control unit 75 of the wireless terminal according to the sixth embodiment is different from that of the wireless terminal 70 of the second embodiment.

In the sixth embodiment, when the occurrence of the interference is detected, the first wireless communication control unit 75 determines the information for assisting in the control of the interference (first assistance information). The first wireless communication control unit 75 performs a control operation of transmitting the interference notification and the information for assisting in the control of the interference to the base station 50. The information for assisting in the control of the interference, for example, includes information (preference information) indicating preference of the wireless terminal 70 regarding the plurality of wireless communications. At that time, the information associating the preference information and the occurrence pattern of the interference is transmitted as the first assistance information, so that the entire combination is divided. In addition, in the same manner as in the fifth embodiment, the preference information, for example, includes information indicating the precedence of a communication service among a plurality of the communication services, when any of the wireless communication of the plurality of the wireless communications has the plurality of the communication services. Specifically, the preference information, for example, includes information indicating the precedence of the communication performance of the wireless communication among a VoIP communication service and a data communication service in the LTE communication. For example, in a case of the LTE VoIP communication preference, the communication performance of the LTE VoIP communication is preceded, and in a case of the LTE VoIP communication preference+the LTE Data communication preference, the communication performance of both of the LTE VoIP communication and the LTE Data communication is preceded by the other communication.

Specifically, FIG. 7A illustrates a setting example of the first assistance information and FIG. 17B illustrates a setting example of the wireless communication parameter based on the first assistance information in (a). In FIGS. 17A and 17B, "mutual interference" indicates that the occurrence of the interference (degradation of the communication performance) is detected in both of the LTE communication and the ISM communication, "only LTE degradation" indicates that the occurrence of the interference (degradation of the communication performance) is detected in the LTE communication, and "only ISM degradation" indicates that the occurrence of the interference (degradation of the communication performance) is detected in the ISM communication. The "LTE VoIP communication preference" indicates preference of the wireless terminal 70 with respect to the VoIP communication service in the LTE communication (precedence of the communication performance of the LTE VoIP communication), and the "LTE VoIP communication preference+the LTE Data communication preference" indicates preference of the wireless terminal 70 with respect to both of the VoIP communication service and the data communication service in the LTE communication (precedence of both communication performances). "ISM communication preference" indicates preference of the wireless terminal 70 with respect to the ISM communication (precedence of the communication performance of the ISM communication).

In the example illustrated in FIGS. 17A and 17B, nine types of information items associating the preference information and the occurrence pattern of the interference are transmitted, as the first assistance information, by being added to the interference notification, as 4-bit control information.

The other configuration of the wireless terminal according to the sixth embodiment is the same as the configuration of the wireless terminal 70 of the second embodiment. The hardware configuration of the wireless terminal according to the sixth embodiment is the same as the hardware configuration of the wireless terminal 70 of the second embodiment.

The operation relating to the wireless communication control unit 58 of the base station according to the sixth embodiment is different from that of the base station 50 of the second embodiment.

In the sixth embodiment, the wireless communication control unit 58 performs a control operation of receiving the interference notification and the information for assisting in the control of the interference (first assistance information) from the wireless terminal 70 and transmitting the control information relating to the wireless communication to the wireless terminal 70. When the information for assisting in the control of the interference is received, the wireless communication control unit 58, for example, determines a wireless communication parameter.

At that time, specifically, as illustrated in FIG. 17B, the base station 50 determines the wireless communication parameter by the nine types of patterns corresponding to the first assistance information.

The other configuration of the base station according to the sixth embodiment is the same as the configuration of the base station 50 of the second embodiment. The hardware configuration of the base station according to the sixth embodiment is the same as the hardware configuration of the base station 50 of the second embodiment.

Next, an operation of the wireless communication system of the sixth embodiment will be described. In the sixth embodiment, in the same manner as in S23 of the second embodiment, the first assistance information is determined as illustrated in FIGS. 17A and 17B, and is transmitted to the base station 50 with the interference notification. In the same manner as in S25 of the second embodiment, when the first assistance information is received, the base station 50 determines the wireless communication parameter. In the same manner as in S27 of the second embodiment, the wireless terminal 70 controls the communication based on the received wireless communication parameter. Accordingly, the interference is controlled so that the interference is decreased or avoided. As described above, since the interference control operation is started according to the first assistance information before the completion of the different frequency measurement, the interference control operation is rapidly executed and the communication performance is improved.

By performing the communication control operation using the wireless communication parameter determined as described above, the activation level or the precedence of the preferred wireless communication or the wireless communication service is relatively increased. With such communication control operation, a difference occurs in the activation levels, and accordingly the interference is decreased or avoided and the communication performance is improved, at least regarding the preferred (precedent) communication of the wireless terminal 70.

At that time, since the nine types of information items associating the preference information and the occurrence pattern of the interference are notified so as to be divided, it is possible to execute more detailed scheduling and determine a more appropriate wireless communication parameter, based on the nine types of information items.

As described above, according to the sixth embodiment, it is possible to control the interference in the wireless terminal and to improve the communication performance, with the wireless terminal executing the plurality of wireless communications.

(Seventh Embodiment)

Next, a wireless communication system according to a seventh embodiment will be described. The entire configuration of the wireless communication system according to the seventh embodiment is the same as the configuration of the wireless communication system of the second embodiment. The operations relating to the determination of the first assistance information and the determination of the wireless communication parameter according to the first assistance information in the seventh embodiment are different from those of the second embodiment. FIGS. 18A and 18B are tables illustrating operation examples of the wireless communication system according to the seventh embodiment. In the following description, the wireless communication system has the same reference numerals, and the description thereof will be omitted.

The configuration of the wireless terminal according to the seventh embodiment is the same as the configuration of the wireless terminal 70 of the second embodiment. The hardware configuration of the wireless terminal according to the seventh embodiment is the same as the hardware configuration of the wireless terminal 70 of the second embodiment.

The operation relating to the wireless communication control unit 58 of the base station according to the seventh embodiment is different from that of the base station 50 of the second embodiment.

In the seventh embodiment, the wireless communication control unit 58 performs a control operation of receiving the interference notification and the information for assisting in the control of the interference (first assistance information) from the wireless terminal 70 and transmitting the control information relating to the wireless communication to the wireless terminal 70. When the information for assisting in the control of the interference is received, the wireless communication control unit 58, for example, determines a wireless communication parameter.

Specifically, as illustrated in the FIG. 18B, in a case where first assistance information is set as X=1 ("LTE communication preference" and the "mutual interference" or the "only LTE degradation"), the base station 50 determines the wireless communication parameter so as to increase the activation level of the LTE communication. When increasing the activation level of (when activating) the LTE communication, the wireless communication parameter is, for example, set so as to increase the frequency of the autonomous denial used in the autonomous denial method.

In a case where first assistance information is set as X=0 ("ISM communication preference" and the "mutual interference" or the "only ISM degradation"), the base station 50 determines the wireless communication parameter so as to decrease the activation level of the LTE communication. When decreasing the activation level of the LTE communication, the wireless communication parameter is, for example, set so as to decrease the frequency of the autonomous denial used in the autonomous denial method.

The other configuration of the base station according to the seventh embodiment is the same as the configuration of the base station 50 of the second embodiment. The hardware configuration of the base station according to the seventh embodiment is the same as the hardware configuration of the base station 50 of the second embodiment.

Next, an operation of the wireless communication system of the seventh embodiment will be described. In the seventh embodiment, in the same manner as in S23 of the second embodiment, the first assistance information is determined as illustrated in FIGS. 14A and 14B, and is transmitted to the base station 50 with the interference notification. In the same manner as in S25 of the second embodiment, when the first assistance information is received, the base station 50 determines the wireless communication parameter. In the same manner as in S27 of the second embodiment, the wireless terminal 70 controls the communication based on the received wireless communication parameter. Accordingly, the interference is controlled so that the interference is decreased or avoided. As described above, since the interference control operation is started according to the first assistance information before the completion of the different frequency measurement, the interference control operation is rapidly executed and the communication performance is improved.

By performing the communication control operation using the wireless communication parameter determined as described above, the activation level or the precedence of the preferred wireless communication or the wireless communication service is relatively increased. With such communication control operation, a difference occurs in the activation levels, and accordingly the interference is decreased or avoided and the communication performance is improved, at least regarding the preferred (precedent) communication of the wireless terminal 70. Specifically, in a case of the preference of the wireless terminal 70 with respect to the LTE communication, the LTE communication is controlled so as to decrease the frequency of the autonomous denial, and accordingly, the activation level of the LTE communication increases. In a case of the preference of the wireless terminal 70 with respect to the ISM communication, the LTE communication is controlled so as to increase the frequency of the autonomous denial, and accordingly, the activation level of the LTE communication decreases and the activation level of the ISM communication relatively increases. With such communication control operation, a difference occurs in the activation levels, and accordingly the interference is decreased or avoided and the communication performance is improved, at least regarding the preferred (precedent) communication of the wireless terminal 70.

As described above, according to the seventh embodiment, it is possible to control the interference in the wireless terminal and to improve the communication performance, with the wireless terminal executing the plurality of wireless communications.

In the seventh embodiment, according to the preference information, the frequency of the autonomous denial used in the autonomous denial method is determined as the wireless communication parameter in the base station 50 and is notified to the wireless terminal 70, but, according to the preference information, the frequency of the autonomous denial used in the autonomous denial method may be determined by the wireless terminal 70 and the interference control operation may be performed using the determined frequency.

In the seventh embodiment, in the same manner as in the second embodiment, when increasing the activation level of the LTE communication, the frequency of the autonomous denial used in the autonomous denial method is increased, and when decreasing the activation level of the LTE communication, the frequency of the autonomous denial used in the autonomous denial method is decreased. The frequency of the autonomous denial may be changed in the same manner as described above, in the third to sixth embodiments.

The wireless communication systems of the first to seventh embodiments may be realized by an LTE system or an LTE-A system, for example. The wireless communication systems may also be applied to a wireless communication system using a communication method other than the LTE or the LTE-A.

In the first to seventh embodiments, the wireless terminal may be applied to a mobile terminal such as a mobile phone, a smart phone, or a personal digital assistant (PDA). The first to fourth embodiments may be applied to various communication devices such as user equipment (UE), a mobile station, or a mobile-relay station which performs the communication with the base station.

The base station of the first to seventh embodiments may be applied to base station with various scales such as a micro base station or a femto base station. In addition, the first to seventh embodiments may be applied to various communication devices such as a relay station which performs the communication with the wireless terminal.

Specific embodiment of the dispersion and integration of the constituent elements of the base station and the wireless terminal is not limited to the first to seventh embodiments, and the embodiments may be configured functionally or physically dispersing and integrating an entirety or some thereof in an arbitrary unit, depending on various loads and used states. For example, the memory may be connected as an external device of the base station and the wireless terminal through a network or a cable.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless terminal, comprising:
    a first transceiver configured to transmit a first type of wireless signal, to a base station; and
    a second transceiver configured to transmit a second type of wireless signal to another communication device; and
    a controller to detect interference among at least one of the first type of wireless signal and the second type of wireless signal and to prepare information configured to show whether the first type of wireless signal is interfered with, whether the second type of wireless signal is interfered with, and whether both the first and second type of wireless signals are interfered with;
    wherein the first transceiver is configured to transmit, to the base station, an indication showing that the controller detects the interference, the indication including the prepared information; and
    the first transceiver is further configured to receive, from the base station, interference control information, the interference control information corresponding to an interference control operation executed by the wireless terminal to mitigate the detected interference, wherein the interference control information from the base station is based on the information configured to show whether the first type of wireless signal is interfered with, whether the second type of wireless signal is interfered with, and whether both the first and second type of wireless signals are interfered with.

2. The wireless terminal of claim 1, wherein the first type of wireless signal is a Long Term Evolution (LTE) type of wireless signal, and the wireless terminal further comprises a controller coupled to the first transceiver, the controller being configured to measure a signal level of the first type of wireless signal after the first transceiver transmits the indication showing that the controller detects interference.

3. The wireless terminal of claim 1, further comprising: at least one antenna coupled to at least one of the first and second transceivers.

4. The wireless terminal of claim 1, wherein the first type of wireless signal is a Long Term Evolution (LTE) type of wireless signal and the second type of wireless signal is one of the group consisting of: a wireless local area network type signal, a Wi-Fi type of signal, and a short-wavelength UHF radio wave signal in an industrial, scientific and medical (ISM) radio band from 2.4 to 2.485 GHz (Bluetooth®) type of signal, and wherein the controller prepares the information to show that both the LTE type and the second type of wireless signals are interfered with.

5. The wireless terminal of claim 1, wherein the first type of wireless signal is transmitted in a specific frequency range allocated to the wireless terminal within a range of frequencies allocable for the first type of wireless signal and wherein the second type of wireless signal is transmitted in a specific frequency range allocated to the wireless terminal within a range of frequencies allocable for the second type of wireless signal, the range of frequencies allocable for the first type of wireless signal and the range of frequencies allocable for the second type of wireless signal being different.

6. The wireless terminal of claim 1, further comprising: a controller coupled to the first and second transceivers, the controller being adapted to detect an occurrence of interference between the first type of wireless signal and the second type of wireless signal.

7. The wireless terminal of claim 1, wherein the indication showing that the controller detects interference is an indication of in-device coexistence (IDC) interference.

8. The wireless terminal of claim 1, wherein the interference control information contains information indicating a selection of one of the group consisting of: a time division multiplexing (TDM) interference reduction arrangement and a frequency division multiplexing (FDM) interference reduction arrangement.

9. The wireless terminal of claim 1, wherein the interference control information indicates interference reduction is achievable by modifying a discontinuous reception (DRX) configuration employed by the wireless terminal.

10. The wireless terminal of claim 1, wherein the first type of wireless signal is a Long Term Evolution (LTE) type of wireless signal and the indication showing that the controller detects interference is transmitted as a radio resource control (RRC) signal, and wherein at least one of the first and second transceivers suspend transmission when mitigation action responsive to the received interference control information fails to reduce the interference to within prescribed acceptable limits.

11. The wireless terminal according to claim 1, wherein the interference control information is further based on a preference among the first type of wireless signal and the second type of wireless signal.

12. A wireless terminal, comprising:
a first transceiver configured to transmit, to a base station, a Long Term Evolution (LTE) type of wireless signal;
a second transceiver configured to transmit, to another communication device, a second type of wireless signal; and
a controller configured to detect interference among at least one of the LTE type of wireless signal and the second type of wireless signal and to prepare information configured to show whether the LTE signal is interfered with, whether the second type of wireless signal is interfered with, and whether both the LTE and the second type of wireless signals are interfered with,
wherein the first transceiver is further configured to receive, from the base station, interference control information, the interference control information corresponding to an interference control operation executed by the wireless terminal to mitigate the detected interference wherein the interference control information is based on the information configured to show whether the LTE signal is interfered with, whether the second type of wireless signal is interfered with, and whether both the LTE type of wireless signal and the second type of wireless signal are interfered with.

13. The wireless terminal of claim 12, wherein the second type of wireless signal is one of the group consisting of: a wireless local area network type signal, a Wi-Fi type of signal, and a short-wavelength UHF radio wave signal in an industrial, scientific and medical (ISM) radio band from 2.4 to 2.485 GHz (Bluetooth®) type of signal, and wherein the controller prepares the information to show that both the LTE type and the second type of wireless signals are interfered with.

14. The wireless terminal of claim 12, wherein the wireless terminal further comprises a controller coupled to the first transceiver, the controller being configured to measure a signal level of the LTE after the controller detects interference.

15. A base station, comprising:
an integrated circuit configured to transmit a Long Term Evolution (LTE) type of wireless communication signals to a wireless terminal and to receive wireless communication signals of the LTE type transmitted from the wireless terminal, the LTE type of wireless communication signals using a first bandwidth and a first wireless protocol; and
a controller coupled to the integrated circuit and configured to receive from the wireless terminal an indication of interference when interference is detected between the LTE type of wireless signal and a second type of wireless signal and information configured to show whether the LTE type of wireless signal is interfered with, whether the second type of wireless signal is interfered with, and whether both the LTE type of wireless signal and the second type of wireless signal are interfered with and wherein the controller is adapted to transmit towards the wireless terminal interference control information, the interference control information corresponding to an interference control operation executed by the wireless terminal to mitigate the detected interference, wherein the interference control information is based on the information configured to show whether the LTE type of wireless signal is interfered with, whether the second type of wireless signal is interfered with, and whether both the LTE type of wireless signal and the second type of wireless signal are interfered with.

16. The base station of claim 15, wherein the interference control information indicates an arrangement to control the interference based on one of the group consisting of: time division multiplexing (TDM) interference reduction and frequency division multiplexing (FDM) interference reduction.

17. The base station of claim 15, wherein the information shows that both the LTE type and the second type of wireless signals are interfered with.

* * * * *